United States Patent
Francini et al.

(10) Patent No.: US 9,245,204 B2
(45) Date of Patent: Jan. 26, 2016

(54) METHOD AND SYSTEM FOR COMPARING IMAGES

(75) Inventors: Gianluca Francini, Torino (IT); Skjalg Lepsoy, Torino (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 14/370,098

(22) PCT Filed: Jan. 2, 2012

(86) PCT No.: PCT/EP2012/050025
§ 371 (c)(1),
(2), (4) Date: Jul. 1, 2014

(87) PCT Pub. No.: WO2013/102488
PCT Pub. Date: Jul. 11, 2013

(65) Prior Publication Data
US 2015/0016723 A1   Jan. 15, 2015

(51) Int. Cl.
*G06K 9/62* (2006.01)
(52) U.S. Cl.
CPC ............ *G06K 9/6211* (2013.01); *G06K 9/6212* (2013.01)
(58) Field of Classification Search
CPC . G06K 9/6209; G06K 9/6211; G06K 9/6212; G06K 9/6215
See application file for complete search history.

(56) References Cited

U.S. PATENT DOCUMENTS

| | | | |
|---|---|---|---|
| 8,165,352 B1 * | 4/2012 | Mohanty et al. | 382/115 |
| 2008/0137957 A1 * | 6/2008 | Xu et al. | 382/190 |
| 2010/0284620 A1 * | 11/2010 | Chertok et al. | 382/209 |
| 2012/0219184 A1 * | 8/2012 | Maki et al. | 382/103 |
| 2013/0308861 A1 | 11/2013 | Cordara et al. | |

OTHER PUBLICATIONS

U.S. Appl. No. 14/370,108, filed Jul. 1, 2014, Balestri, et al.
U.S. Appl. No. 14/370,133, filed Jul. 1, 2014, Balestri, et al.
International Search Report Issued Jul. 16, 2012 in PCT/EP12/050025 filed Jan. 2, 2012.
Written Opinion of the International Searching Authority issued Jul. 16, 2012 in PCT/EP12/050025 filed Jan. 2, 2012.
Fleck, D. et al., "Affine Invariant-Based Classification of Inliers and Outliers for Image Matching", Image Analysis and Recognition, pp. 268-277, XP019122387, 2009.

(Continued)

*Primary Examiner* — Yubin Hung
(74) *Attorney, Agent, or Firm* — Oblon, McClelland, Maier & Neustadt, L.L.P.

(57) ABSTRACT

A method comparing first and second images, including: identifying and matching first and second keypoints in the first and second images; arranging a distribution of values of a calculated plurality of first distance ratios in a histogram; determining a number of correct keypoint matches, including: determining a matrix, each matrix element corresponding to a respective pair of keypoint matches with a value corresponding to a difference between a value of the histogram including a distance ratio of the respective pair of keypoint matches and an outlier probability density value weighted by a parameter; determining the parameter value such that the matrix dominant eigenvector is equal to a vector with a first value if the pair of keypoint match is correct and a second value if the pair of keypoint match is incorrect; determining the number of correct keypoint matches based on the dominant eigenvalue associated to the dominant eigenvector.

13 Claims, 22 Drawing Sheets

(56) References Cited

OTHER PUBLICATIONS

Tsai, S. et al., "Fast Geometric Re-Ranking for Image-Based Retrieval", Proceedings of 2010 IEEE 17th International Conference on Image Processing, pp. 1029-1032, XP031810692, 2010.

Fleck, D. et al., "An Evaluation of Affine Invariant-Based Classification for Image Matching", Advances in Visual Computing, pp. 417-429, XP019135110, 2009.

Lepsoy, S. et al., "Statistical Modelling of Outliers for Fast Visual Search", Multimedia and Expo (ICME), pp. 1-6, XP031964858, 2011.

* cited by examiner

METHOD AND SYSTEM FOR COMPARING IMAGES

BACKGROUND OF THE INVENTION

1. Field of the Invention

The present invention relates to the field of the image analysis.

2. Description of the Related Art

In the field of the image analysis, a common operation provides for comparing two images in order to find the relation occurring therebetween in case both the images include at least a portion of a same scene or of a same object.

Among a high number of applications, the image comparison is of the utmost importance for calibrating video cameras belonging to a multi-camera system, for assessing the motion occurring between two frames of a video shoot, and for the recognition of an object within an image (e.g., a picture). The latter application is now assuming more and more importance due to the recent development of object recognition algorithms specifically designed to be employed in the so-called visual searching engines, i.e., automated services that, starting from a picture, are capable of identifying the object(s) pictured therein and offering information related to the identified object(s). Examples of known services of this type include Google Goggles, Nokia Point&Find, and kooaba Smart Visuals. An object recognition application provides for comparing a first image—in jargon, referred to as "query image"—depicting an object to be recognized with a plurality of reference images, each one depicting a respective known object; this allows to perform a comparison among the object depicted in the query image and the objects depicted in the reference images.

The reference images are typically arranged in a proper reference database. The higher the number of reference images included in the database, the higher the number of comparing operations to be performed. In some cases the reference database may become very large, negatively affecting the efficiency of the object recognition process. For example, in case the object recognition is exploited in an online shopping scenario, wherein each reference image corresponds to an item offered by an online store (e.g., the picture of a book cover, a DVD cover and/or a CD cover), the number of reference images may exceed few millions of unities. Moreover, in order to efficiently manage such huge amount of data, the comparing operations should be performed by a processing unit provided with a sufficient processing power.

In the last decade, different algorithms have been proposed for reducing the time required to perform object recognition. These algorithms provides for heavily reducing the number of reference images which are candidate to include the object depicted in the query image.

A very efficient way for performing comparing operations between two images provides for selecting a set of points—in jargon, referred to as keypoints—in the first image and then matching each keypoint of the set to a corresponding keypoint in the second image. The selection of which point of the first image has to become a keypoint is carried out by taking into consideration local features of the area of the image surrounding the point itself. On this regard, see "Distinctive image features from scale-invariant keypoints" by David G. Lowe, *International Journal of computer vision*, 2004.

If a matching between a keypoint of the first image and a corresponding keypoint of the second image is correct, in the sense that both keypoints correspond to a same point of a same object (depicted in both the two images), such keypoint match is referred to as "inlier".

Conversely, if a matching between a keypoint of the first image and a corresponding keypoint of the second image is incorrect, in the sense that the two keypoints do not correspond to a same point of the same object, such keypoint match is referred to as "outlier".

Therefore, in order to obtain a reliable result, a procedure capable of distinguishing the inliers from the outliers is advantageously performed after the keypoint matches have been determined.

Several examples of procedures of this type are already known in the art.

The most used procedure makes use of the RANSAC algorithm disclosed in "Random sample consensus: A paradigm for outlier fitting with applications to image analysis and automated cartography" by Martin A. Fischler and Robert C. Bolles, *Communications of the ACM*, 24(6):381-395, June 1981. However, this algorithm is time consuming, because is based on an iterative approach.

The algorithms disclosed in "Fast geometric re-ranking for image-based retrieval" by Sam S. Tsai, Davide Chen, Gabriel Takacs, Vijay Chandrasekhar, Ramakrishna Vedantham, Radek Grzeszczuk, Bernd Girod, *International Conference on Image Processing*, October 2010, and in the international patent application WO2009/130451 are based on the fact that the ratio between the distances of keypoints is an invariant under translation, rotation, and scaling. Further algorithms of this type are also disclosed in "Adding Affine Invariant Geometric Constraint for Partial-Duplicate Image Retrieval" by Zhipeng Wu, Qianqian Xu, Shuqiang Jiang, Qingming Huang, Peng Cui, Liang Li, *International Conference on Pattern Recognition*, August 2010, pages 842-845, and in "Using Local Affine Invariants to Improve Image Matching" by Daniel Fleck, Zoran Duric, 20*th International Conference on Pattern Recognition*, 2010, pages 1844-1847.

Further, US 2010/0135527 A1 discloses an image recognition algorithm including a keypoints-based comparison and a region-based color comparison. A method of identifying a target image using the algorithm includes: receiving an input at a processing device, the input including data related to the target image; performing a retrieving step including retrieving an image from an image database, and, until the image is either accepted or rejected, designating the image as a candidate image; performing an image recognition step including using the processing device to perform an image recognition algorithm on the target and candidate images in order to obtain an image recognition algorithm output; and performing a comparison step including: if the image recognition algorithm output is within a pre-selected range, accepting the candidate image as the target image; and if the image recognition algorithm output is not within the pre-selected range, rejecting the candidate image and repeating the retrieving, image recognition, and comparison steps.

US2010/0183229 A1 refers to a method, system and computer program product for matching image. The images to be matched are represented by feature points and feature vectors and orientations associated with the feature points. First, putative correspondences are determined by using feature vectors. A subset of putative correspondences is selected and the topological equivalence of the subset is determined. The topologically equivalent subset of putative correspondences is used to establish a motion estimation model. An orientation consistency test is performed on the putative correspondences and the corresponding motion estimation transformation that is determined, to avoid an infeasible transformation. A coverage test is performed on the matches that satisfy orientation consistency test. The candidate matches that do not cover a significant portion of one of the images are rejected. The final match images are provided in the order of decreasing matching, in case of multiple images satisfying all the test requirements.

"An Evaluation of Affine Invariant-Based Classification for Image Matching" by Daniel Fleck et al, 30 Nov. 2009, ADVANCES IN VISUAL COMPUTING, SPRINGER BERLIN HEIDELBERG, BERLIN, HEIDELBERG, page(s) 417-429, discloses a detail evaluation of an approach that uses affine invariants for wide baseline image matching. Specifically, the approach uses the affine invariant property that ratios of areas of shapes are constant under an affine transformation. Thus, by randomly sampling corresponding shapes in the image pair a histogram of ratios of areas can be generated. The matches that contribute to the maximum histogram value are then candidate inliers.

"Affine Invariant-Based Classification of Inliers and Outliers for Image Matching" by Daniel Fleck et al, 6 Jul. 2009, IMAGE ANALYSIS AND RECOGNITION, SPRINGER BERLIN HEIDELBERG, BERLIN, HEIDELBERG, page(s) 268-277, discloses an approach to classify tentative feature matches as inliers or outliers during wide baseline image matching. Specifically, the approach uses the affine invariant property that ratios of areas of shapes are constant under an affine transformation. Thus, by randomly sampling corresponding shapes in the image pair a histogram of ratios of areas can be generated. The matches that contribute to the maximum histogram value are then candidate inliers. The candidate inliers are then filtered to remove any with a frequency below the noise level in the histogram. The resulting set of inliers is used to generate a very accurate transformation model between the images.

Further, "Statistical modelling of outliers for fast visual search", by S. Lepsoy, G. Francini, G. Cordara, P. P. B. de Gusmao, IEEE International Conference on Multimedia and Expo (ICME), 2011, discloses that the matching of keypoints present in two images is an uncertain process in which many matches may be incorrect. The statistical properties of the log distance ratio for pairs of incorrect matches are distinctly different from the properties of that for correct matches. Based on a statistical model, it is proposed a goodness-of-fit test in order to establish whether two images contain views of the same object. This technique can be used as a fast geometric consistency check for visual search.

SUMMARY OF THE INVENTION

The Applicant has found that most of the above mentioned known approaches for implementing object recognition services are affected by several drawbacks. In particular, these approaches are time consuming, being based on iterative procedures and/or requiring a huge amount of data to be processed.

The Applicant has tackled the problem of how to improve these approaches in terms of time consuming and amount of data to be processed.

In particular, the Applicant has tackled the problem to provide a method for comparing image that is reliable in terms of data processing and has good performance in terms of time consumption.

The Applicant has found that by starting from a set of keypoints generated on a first image (query image) and associated to a corresponding set of keypoints generated on a second image (reference image) so as to form a corresponding set of keypoint matches, a method for comparing image according to the present invention is able to assess how many keypoint matches are inliers among the whole set of keypoint matches.

The method according to the present invention is also able to specifically identify which keypoint matches are inliers, and which keypoint matches are outliers.

More specifically, according to an aspect of the present invention, a method for comparing a first image with a second image, comprises: identifying first keypoints in the first image and second keypoints in the second image; forming matches between first and second keypoints by associating each first keypoint with a corresponding second keypoint; calculating a plurality of first distance ratios, each first distance ratio being based on the ratio of the distance between a pair of said first keypoints and the distance between a corresponding pair of said second keypoints matching the pair of first keypoints; arranging a distribution of values of said calculated plurality of first distance ratios in a histogram having a plurality of ordered bins each corresponding to a respective interval of values of the first distance ratios, the histogram enumerating for each bin a corresponding number of first distance ratios of the distribution having values comprised within the respective interval; generating an outlier density function expressing a statistical distribution of a plurality of second distance ratios corresponding to a random selection of keypoints pairs in the first and second images, said plurality of second distance ratios being based on the ratio of the distance between pairs of first keypoints in the first image and the distance between corresponding pairs of randomly selected second keypoints in the second image; discretizing said outlier density function by generating for each of said bin a corresponding outlier probability density value. The method further comprises: determining a number of correct keypoint matches, each formed by a first and a second keypoints corresponding to a same point of a same object depicted in the first and second images, said determining a number of correct keypoint matches including: determining a matrix, each element of said matrix corresponding to a respective pair of keypoint matches and having a value corresponding to the difference between the value of said histogram at the bin including the distance ratio of the respective pair of keypoint matches and the outlier probability density value corresponding to said bin, said outlier probability density value being weighted by means of a parameter ($\beta$); determining a value of the parameter ($\beta$) such that the dominant eigenvector of the matrix is equal to a vector (r) having elements of a first value if the pair of keypoint match is a correct keypoint match and of a second value if the pair of keypoint matches is an incorrect keypoint match; determining the number of correct keypoint matches as an expression of the dominant eigenvalue associated to said dominant eigenvector. For comparing said first image with said second image the determined number of correct keypoint matches is exploited.

Preferably, said determining the number of correct keypoint matches as an expression of the dominant eigenvalue includes: determining the number of correct keypoint matches as an expression of the ratio between the dominant eigenvalue and the maximum value of the difference between the value of the histogram at the bin including the distance ratio of the respective pair of keypoint matches and the outlier probability density value corresponding to said bin, said outlier probability density value being weighted by means of said determined parameter ($\beta$).

Preferably, said determining the number of correct keypoint matches as an expression of the dominant eigenvalue includes determining said number as one plus said ratio between the dominant eigenvalue and said maximum value.

Advantageously, the method further includes: identifying which keypoint matches are most likely correct keypoint matches by identifying a number, equal to said number of correct keypoint matches, of elements of said dominant eigenvector having the highest absolute values.

Preferably, said plurality of first distance ratios correspond to the logarithm of the ratio of the distance between a pair of said first keypoints and the distance between a corresponding pair of said second keypoints matching the pair of first keypoints.

Preferably said parameter ($\beta$) is the result of the projection of said histogram onto said discretized outlier density function.

According to another aspect of the present invention, an apparatus for comparing a first image with a second image comprises: a first identification unit configured to identify first keypoints in the first image and second keypoints in the second image; an association unit configured to form matches between first and second keypoints by associating each first keypoint with a corresponding second keypoint; a calculation unit configured to calculate a plurality of first distance ratios, each first distance ratio being based on the ratio of the distance between a pair of said first keypoints and the distance between a corresponding pair of said second keypoints matching the pair of first keypoints; an arranging unit configured to arrange a distribution of values of said calculated plurality of first distance ratios in a histogram having a plurality of ordered bins each corresponding to a respective interval of values of the first distance ratios, the histogram enumerating for each bin a corresponding number of first distance ratios of the distribution having values comprised within the respective interval; a generation unit configured to generate an outlier density function expressing a statistical distribution of a plurality of second distance ratios corresponding to a random selection of keypoints pairs in the first and second images, said plurality of second distance ratios being based on the ratio of the distance between the pair of first keypoints in the first image and the distance between the correspondingly pairs of randomly selected second keypoints in the second image; a discretizing unit configured to discretize said outlier density function by generating for each bin a corresponding outlier probability density value. The apparatus further comprises: a determining unit configured to determine a number of correct keypoint matches, each formed by a first and a second keypoint corresponding to a same point of a same object depicted in the first and second images, said determining unit including: a first determining sub-unit configured to determine a matrix, each element of said matrix corresponding to a respective pair of keypoint matches and having a value corresponding to the difference between the value of the histogram at the bin including the distance ratio of the respective pair of keypoint matches and the outlier probability density value corresponding to said bin, said outlier probability density value being weighted by means of a parameter ($\beta$); a second determining sub-unit configured to determine a value of the parameter ($\beta$) such that the dominant eigenvector of the matrix is equal to a vector (r) having elements of a first value if the pair of keypoint match is a correct keypoint match an of a second value if the pair of keypoint match is an incorrect keypoint match; a third determining sub-unit configured to determine the number of correct keypoint matches as an expression of the dominant eigenvalue associated to said dominant eigenvector. The apparatus further comprises a comparing unit configured to compare said first image with said second image exploiting the determined number of correct keypoint matches.

Preferably the apparatus further includes an identification unit configured to identify which keypoint matches are most likely correct keypoint matches by identifying a number, equal to said number of correct keypoint matches, of elements of said dominant eigenvector having the highest absolute values.

A further aspect of the present invention provides for a system including: a keypoint detection unit configured to receive a query image and identify corresponding first keypoints in said image; a feature computation unit configured to describe the local aspect of said first keypoints through corresponding first local descriptors; a reference database storing a plurality of reference images, for each reference image, the reference database further storing corresponding second keypoints and corresponding second local descriptors of the second keypoints; a feature matching unit configured to compare, for each reference image of at least one group of reference images, the first local descriptors with the second local descriptors of said reference image, and accordingly associate the first keypoints with the second keypoints of said reference image to generate a corresponding set of keypoint matches; a selection unit configured to select a subset of reference figures based on the comparisons carried out by the feature matching unit, and an optimization unit configured to calculate, for each pair comprising the query image and a reference image of the subset, the number of correct keypoint matches by using the above described apparatus.

Preferably, the system comprises a visual search server and a plurality of terminals configured to provide query images to the visual search server through a network, wherein the visual search server includes the keypoint detection unit, the feature computation unit, the reference database, the feature matching unit, the selection unit and the optimization unit.

Preferably, the system comprises a visual search server and a plurality of terminals configured to provide query images to the visual search server through a network, wherein: the visual search server includes the reference database, the feature matching unit, the selection unit and the optimization unit, and each terminal includes a respective keypoint detection unit and a respective feature computation unit.

Preferably, the system further comprising a visual search server and a plurality of terminals configured to exchange data with the visual search server through a network, wherein: the visual search server includes the reference database, and each terminal includes a respective keypoint detection unit, a respective feature computation unit, a respective feature matching unit, a respective selection unit, a respective optimization unit and a respective local database, wherein: each terminal is configured to receive from the visual search server a respective set of second keypoints and corresponding second local descriptors of the second keypoints stored in the reference database, and the local database of the terminal is configured to store said received set of second keypoints and second local descriptors, said stored set of second keypoints and second local descriptors corresponding to the reference images of the at least one group of reference images.

According to a further aspect of the present invention, a method for retrieving images includes: receiving a query image and identifying corresponding first keypoints in said image; comparing said query image with a plurality of reference images, second keypoints being associated with each reference image, and accordingly associating the first keypoints with the second keypoints of said reference image to generate a corresponding set of keypoint matches; determining a number of correct keypoint matches between said query image and each of said plurality of reference images based on the method above described; selecting a subset of reference images as the reference images for which the number of correct keypoint matches exceeds a predetermined threshold.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1A:
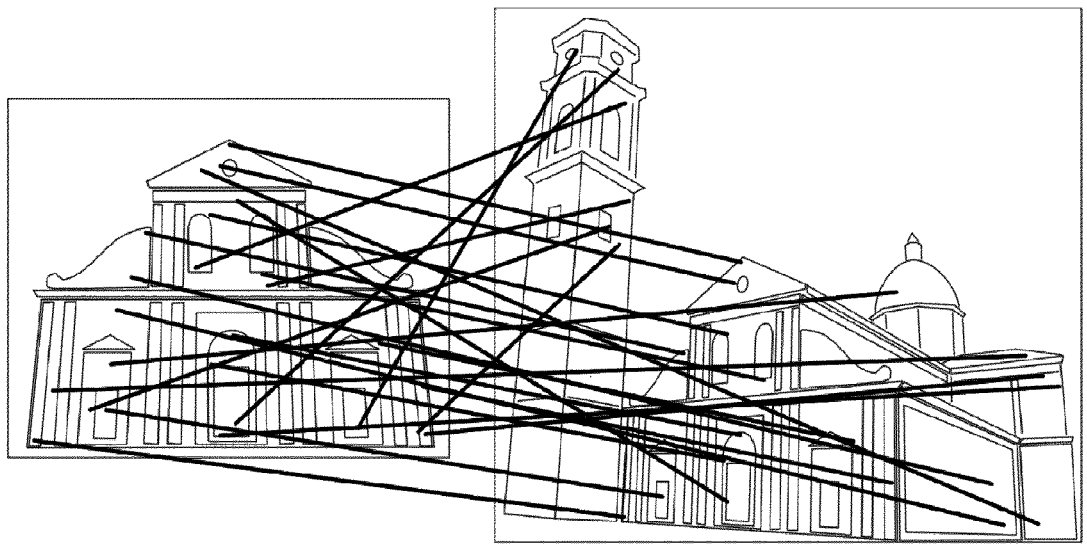
FIG. 1A illustrates an example in which keypoints of two images are associated to each other to form keypoint matches.

As already mentioned above, a comparison between two images provides for matching keypoints of the first image with corresponding keypoints of the second image. A keypoint match is said to be correct (inlier) if the corresponding keypoints of the two images correspond to a same point of a same object (depicted in both the two images); conversely, a keypoint match is said to be incorrect (outlier) if the two keypoints do not correspond to a same point of the same object. In the example illustrated in FIG. 1A, wherein each image is a picture of a same object (a church), each keypoint match is depicted with a respective solid line. The keypoint matches illustrated in the exemplary case of FIG. 1A includes both inliers and outliers. A version of the same exemplary case in which the outliers have been removed is instead depicted in FIG. 1B.

In the following of the present description there will be described an image comparison method. Starting from a set of keypoints generated on a first image—referred to as query image, or simply query—associated to a corresponding set of keypoints generated on a second image—referred to as reference image—so as to form a corresponding set of keypoint matches, the proposed method is able to assess how many keypoint matches are inliers among the whole set of keypoint matches and also to specifically identify which keypoint matches are inliers, and which keypoint matches are outliers.

In Section 1 of the present description there will be introduced the properties of the particular statistic used in this method, and the concept of log distance ratio, both for incorrect and correct matches. The following two sections (Sections 2-3) disclose mathematical and statistical aspects of the stages of the proposed method. Section 4 discloses the main steps of the stages of the method. The last section (Section 5) is directed to exemplary applications of the proposed method.

Section 1—the Logarithmic Distance Ratio

Let it be considered a set of N matched keypoints (matches)

$$(x_1, y_1), \ldots, (x_i, y_i), \ldots, (x_N, y_N) \qquad (1)$$

where $x_i$ contains the coordinates of the i-th keypoint in the query image and $y_i$ contains the coordinates of its matching keypoint in the reference image. A pair $(x_i, y_i)$ is called an inlier if the two keypoints are correctly matched. Conversely, a pair is called an outlier if the keypoints are incorrectly matched. The number N is typically a result of the matching process that is performed initially. Typical values of N range between 5 and 500, preferably between 20 and 400. If the number of matches exceeds the above thresholds, or is otherwise esteemed to be relatively high in comparison with the computational resources needed to perform the inlier selection process according to the invention, the person skilled in the art may reduce the number of matches used to carry out the invention method by selecting a number of matches N'<N.

The proposed method makes use of the so-called log distance ratio (LDR for short) proposed in the above cited paper by Tsai et al.:

$$ldr(x_i, x_j, y_i, y_j) = \ln\left(\frac{\|x_i - x_j\|}{\|y_i - y_j\|}\right). \qquad (2)$$

The keypoints must be distinct, i.e., $$x_i \neq x_j, y_i \neq y_j,$$

and the LDR is undefined for i=j. The LDR is a function of the length ratio, an invariant for similarities. Thanks to the presence of the logarithm operator, if the query image is exchanged with the reference image (x becomes y and vice versa), the LDR reverses sign.

Given a set of N matched keypoints $(x_i, y_i)$ including N keypoints $x_i$ on the query image and N corresponding keypoints $y_i$ on the reference image, there exists a number $$n = \frac{N \cdot (N-1)}{2}$$

of distinct log distance ratios. The statistical distribution of such log distance ratios is expressed in the form of a corresponding histogram, herein referred to as "LDR histogram". The LDR histogram will be denoted by the array $h=[h_1 \ldots h_k]^T$. h is an array of frequencies that arises when counting the observed log distance ratios contained within each of K predefined intervals $T_1, \ldots, T_K$, hereinafter referred to as bins. For example, such bins may be the 25 intervals of width equal to 0.2 between the lower value −2.5 and the upper value 2.5, i.e.:

$$T_1=[-2.5,-2.3), T_2=[-2.3,-2.1), \ldots, T_{25}=[2.3,2.5]$$

Figure 1B:
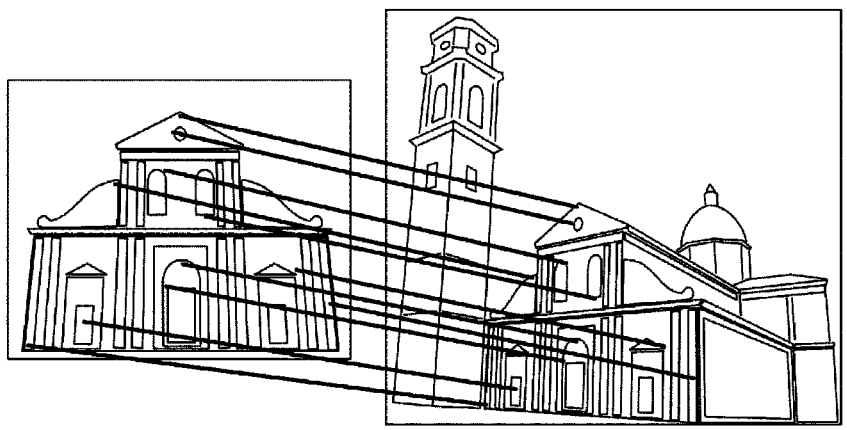
FIG. 1B illustrates the example of FIG. 1A, in which only the inliers are depicted.
Figure 1C:
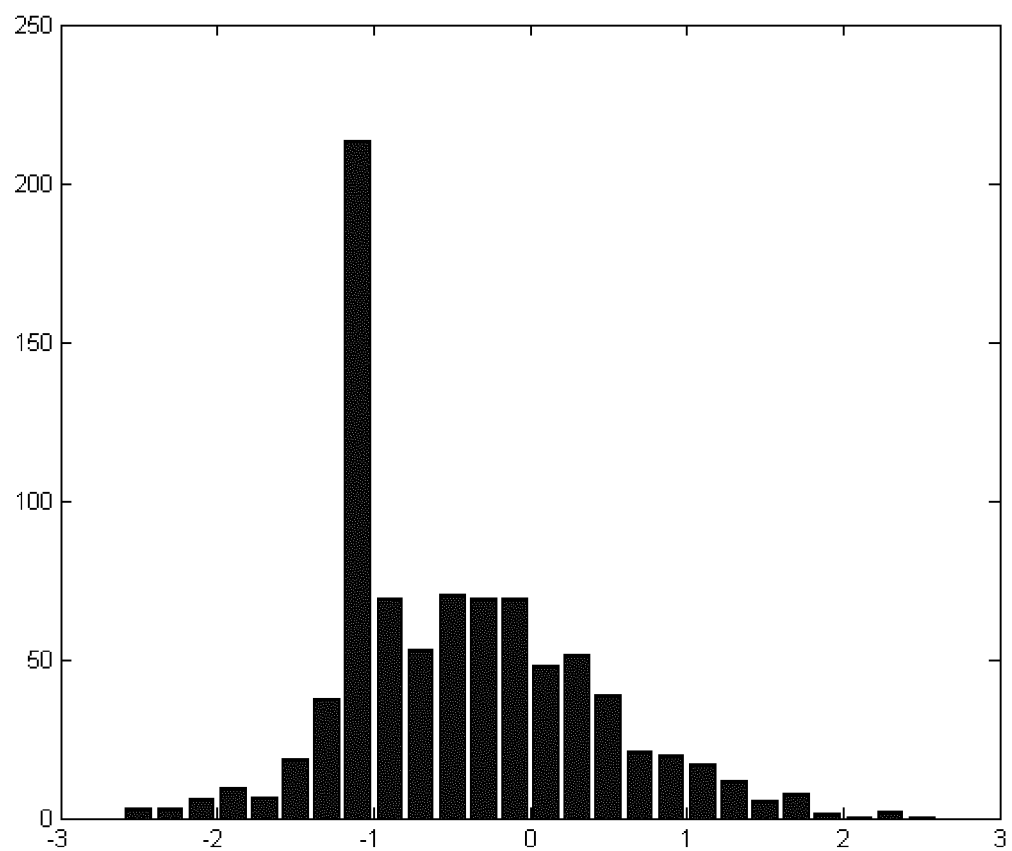
FIG. 1C illustrates a LDR histogram corresponding to the example of FIG. 1A.

An example of LDR histogram corresponding to the case of FIG. 1A is illustrated in FIG. 1C.

Note that the sum of all elements in h is $n=N(N-1)/2$, the number of distinct pairs of matches. h may be considered as if it were obtained by measuring n values of a random variable Z with the probability density function $p_Z(z)$, representative of the LDR of the various pairs of keypoint matches. $p_Z(z)$ may be called the overall density function. In this way, the expected value over a bin in the LDR histogram is $$E(h(k)) = n \cdot \int_{z \in T_k} p_Z(z) dz = n \cdot p_{Z,k} \quad (3)$$

where $p_{Z,k}$ is the probability that the LDR value falls within the interval $T_k$. The maximum likelihood estimate of $p_{Z,k}$ is the histogram value divided by the number of observations, $$p_{Z,k} = \frac{h(k)}{n} \quad (4)$$

see for example "An introduction to Mathematical Statistics and its Applications" by R. J. Larsen and M. L. Marx, New Jersey, page 338, Prentice-Hall, second edition, 1986.

1.1 Two Components of the Histogram and of the Probability Density Function

Pairs of keypoint matches are ordered into two categories: either both matches are inliers, or at least one of them is an outlier (this second category will be called mixed and outlier pairs.) The histogram is therefore the sum of two components, each due to the observed LDR values for pairs in one category. The histogram component for inlier pairs is denoted by $h_{in}=\{h_{in}(1), \ldots, h_{in}(K)\}$ and the component for mixed and outlier pairs is denoted by $h_{out}=\{h_{out}(1), \ldots, h_{out}(K)\}$. Then, $$h(k)=h_{in}(k)+h_{out}(k), k=1, \ldots, K. \quad (5)$$

The statistics of the LDR depend on the category, as argued in the next section. In the same manner as for the LDR histogram, it is written the overall probability density function as the sum of two conditional probability densities. Let $P_{in}$ denote the probability that a given pair contains two inliers, and let $P_{out}$ denote the probability that there is at least one outlier in the pair. The conditional probability density functions will be denoted by p(z|in) for inlier matches and by p(z|out) for mixed and outlier matches. Then, the overall density function for z is the sum $$P_Z(z)=P_{in}p(z|in)+P_{out}p(z|out), \quad (6)$$

As in Equation 4, the terms on the right hand side may be integrated to obtain the expected value of the two histogram components $$E(h_{in}(k)) = n \cdot P_{in} \int_{z \in T_k} p(z | in) dz \quad (7)$$

$$E(h_{out}(k)) = n \cdot P_{out} \int_{z \in T_k} p(z | out) dz \quad (8)$$

The probability density functions and their integrals E(h(k)), $E(h_{in}(k))$, $E(h_{out}(k))$ are useful abstractions. The only observed quantity is the LDR histogram, however, and it provides information about the overall density function. The following principle is applied, in line with the maximum likelihood estimation of Equation 4:

The overall density function $p_Z(z)$ is such that the expected LDR histogram is equal to the observed LDR histogram.

Therefore, $$h(k)=E(h(k))=E(h_{in}(k))+E(h_{out}(k)), k=1, \ldots, K. \quad (9)$$

The next section discusses the conditional probability density functions for both categories.

1.2 The Conditional Probabilities

The LDR is a function of two generic keypoint pairs, i.e., $(x_i, y_i)$ and $(x_j, y_j)$. Three possible conditions may occur: either both pairs are outliers, both are inliers, or one pair is an inlier while the other is an outlier.

1.2.1 The LDR when Both Pairs are Outliers

The matching process is not constrained by any knowledge about the geometry of the scene in the images as such knowledge is not available before the matching is carried out. There is no mechanism that prevents erroneous matches, even if the two images do show the same objects. If the two images do not show the same or very similar objects, then any matching must be considered incorrect.

Even though the matching process is deterministic, the positions of the incorrectly matched keypoints are unpredictable. It is generally impossible to discover any geometric pattern for the outliers, and there are no first principles from which such a pattern might be deduced. Therefore, the incorrect matching is considered as a random process, and the behavior of outliers is modeled through a proper density function, referred to as outlier density function.

Definition of the Outlier Density Function.

Let A and B be rectangles. Suppose that $x_i, x_j \in A$ and $y_i, y_j \in B$ are points drawn at random, corresponding to random variables $X_i, X_j$ and $Y_i, Y_j$. Let the random variable Z be the LDR $$Z=\mathrm{ldr}(X_i, X_j, Y_i, Y_j).$$

The outlier density function is the probability density function $f_Z(z)$ for Z and it will be used as the conditional probability density function $$p(z|out)=f_Z(z)$$

The outlier density function may be expressed for two types of keypoint distributions: normal and uniform.

Normally Distributed Keypoint Coordinates.

The assumption that the keypoints are normally distributed leads to a simple formulation of the outlier density function, which is a good approximation of real cases.

It is supposed that the keypoints of the query image are independent and identically distributed (i.i.d.), behaving as a random variable X that is distributed normally with mean $\mu$ and variance $(\frac{1}{2})I$:

$$X \sim N\left(\mu, \frac{1}{2}I\right). \quad (10)$$

It is assumed that the coordinates have been suitably scaled so that the keypoints are distributed over the whole image (note that the variance is the same in the horizontal and vertical directions.) Then, the difference between two keypoints has a normal distribution as well:

$$X_i - X_j \sim N(0, I); i \neq j. \tag{11}$$

Suppose that the keypoints $\{Y_n\}$ in the reference image have the same statistics as $\{X_n\}$ and that keypoint $X_n$ is matched to keypoint $Y_n$. Then, the squared distance ratio has an F-distribution with (2, 2) degrees of freedom $$R_{ij}^2 = \frac{\|X_i - X_j\|^2}{\|Y_i - Y_j\|^2} \sim F(2, 2), \tag{12}$$

as shown, e.g., in "An introduction to Mathematical Statistics and its Applications" by R. J. Larsen and M. L. Marx, New Jersey, page 338, Prentice-Hall, second edition, 1986.

The probability density function F(2,2) is $$f_S(s) = \frac{1}{(s+1)^2} \tag{13}$$

wherein the symbol for the random variable $R_{ij}^2$ Equation 12 has been substituted by S, for the sake of simplicity. Since the log distance ratio is being considered (and not the squared distance ratio), the square root and the logarithm is applied to the random variable $S = R_{ij}^2$. Furthermore, in order to account for different sizes of the two images or for different spread of the keypoints in the two images, the function is extended to such cases by multiplying the random variable by a parameter a corresponding to the proportion of the standard deviations of the keypoints in the two images, i.e.:

$$\frac{\sigma_x^2}{\sigma_y^2} = a^2 \tag{14}$$

These modifications to the F(2,2) probability density function yield the following outlier density function.

Outlier Density Function.

Let two images have random keypoints $\{X_n\}$ and $\{Y_n\}$, all of which have a bivariate normal distribution with variances $\sigma_x^2$ in the first image and $\sigma_y^2$ in the second image. Let $a^2$ be the proportion of the variances, $$\frac{\sigma_x^2}{\sigma_y^2} = a^2.$$

Applicants have determined that the log distance ratio has the probability density function:

$$f_Z(z; a) = 2\left(\frac{ae^z}{e^{2z} + a^2}\right)^2. \tag{15}$$

Figure 2:
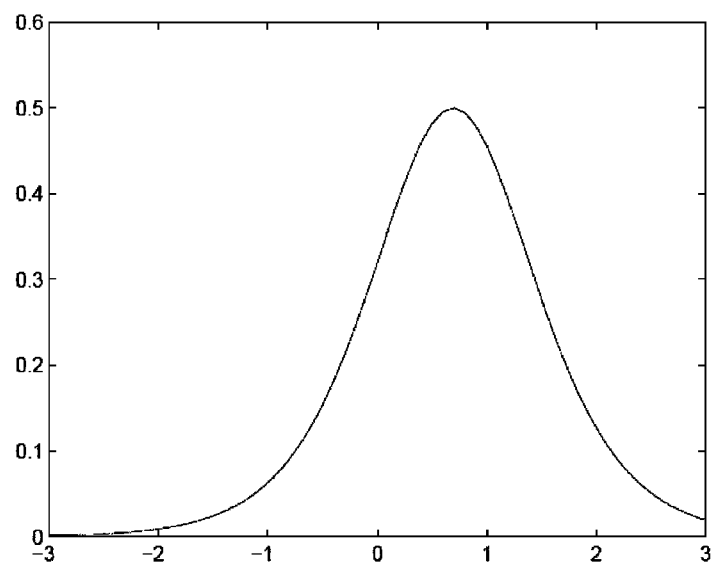
FIG. 2 illustrates the shape of an outlier density function according to an embodiment of the invention.
Figure 3A:
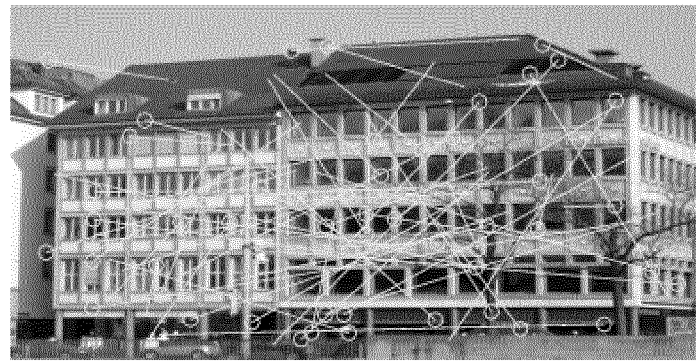
FIGS. 3A-3F illustrate several examples of LDR histograms generated from pair of images taken from the Zurich Building Image Database.
Figure 3A:
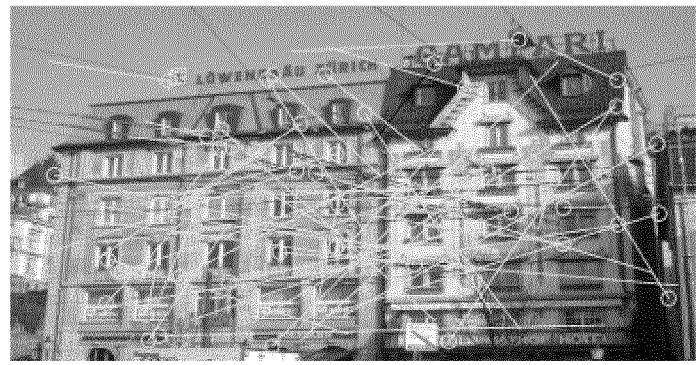
Figure 3A:
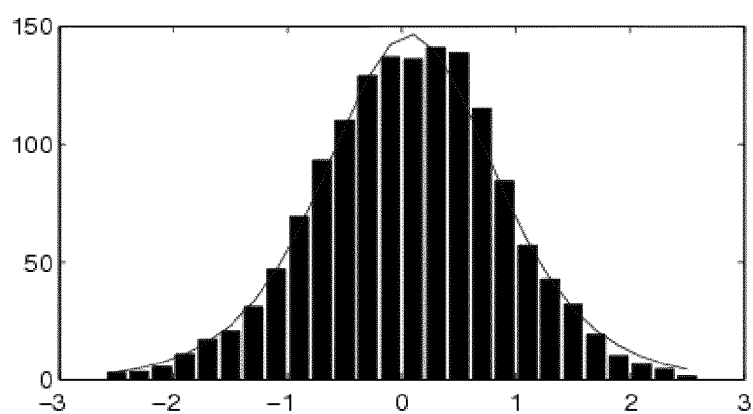
Figure 3B:
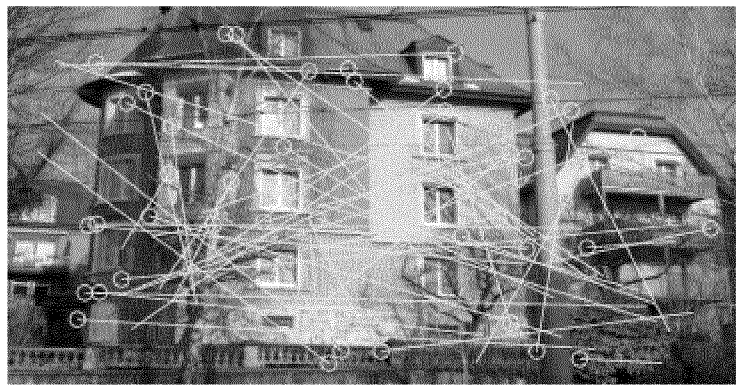
Figure 3B:
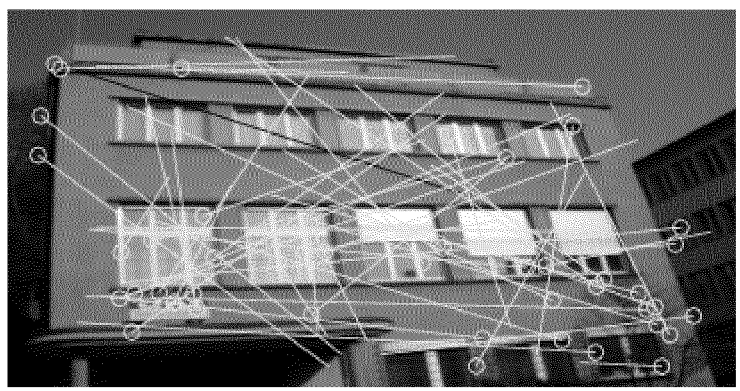
Figure 3B:
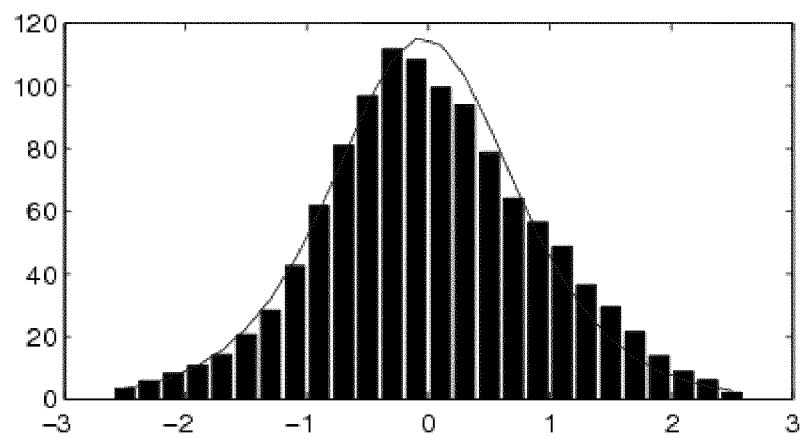
Figure 3C:
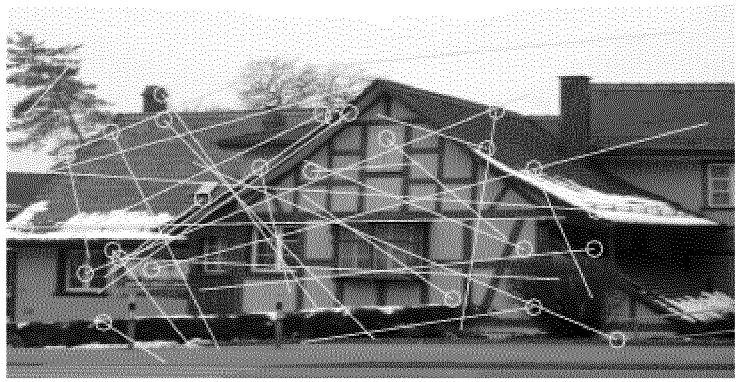
Figure 3C:
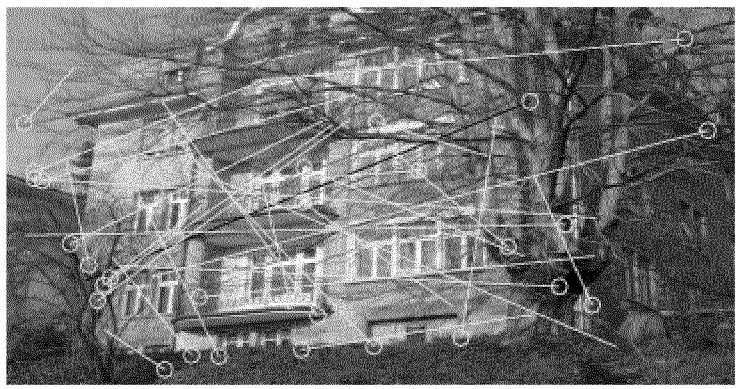
Figure 3C:
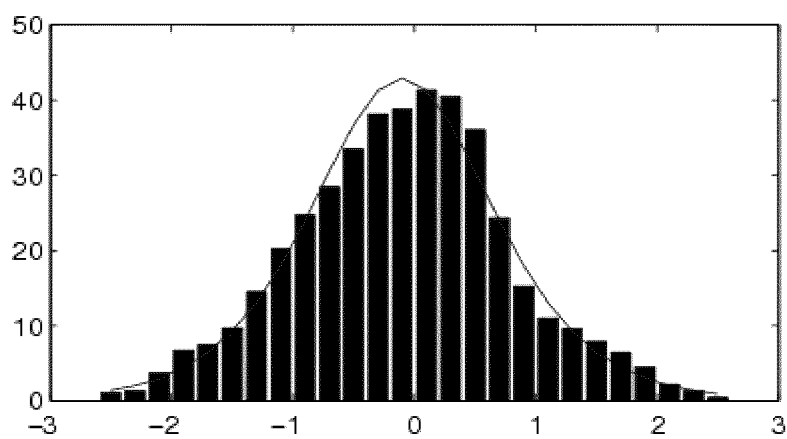
Figure 3D:
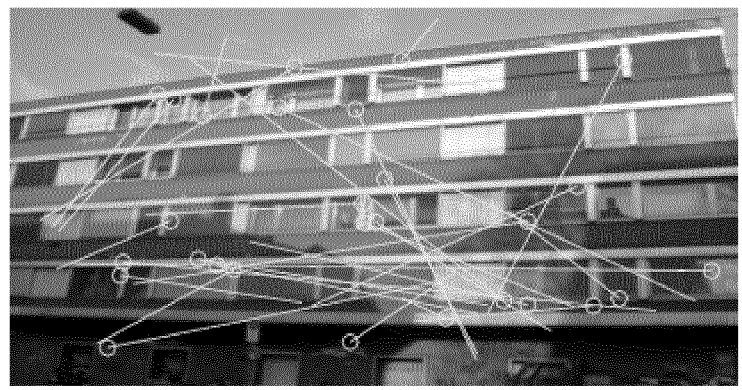
Figure 3D:
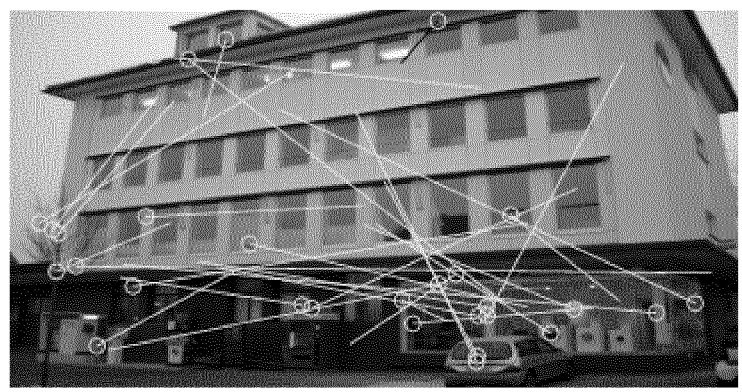
Figure 3D:
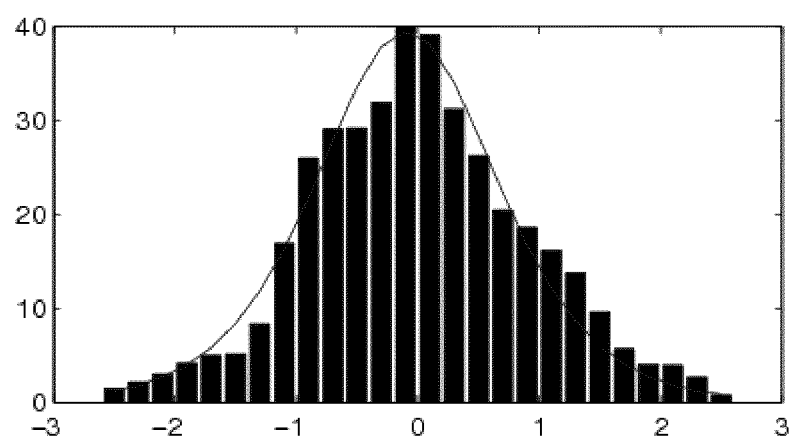
Figure 3E:
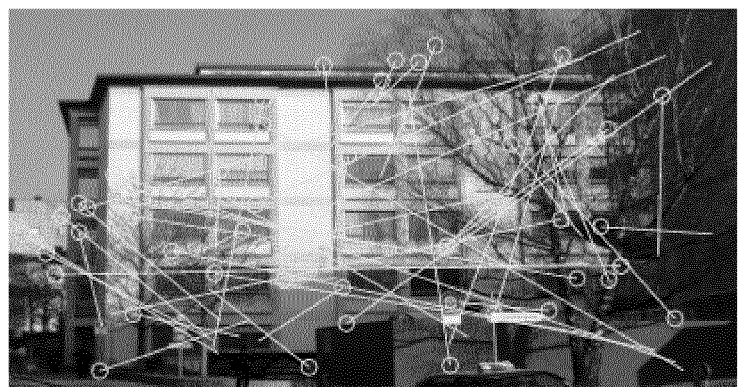
Figure 3E:
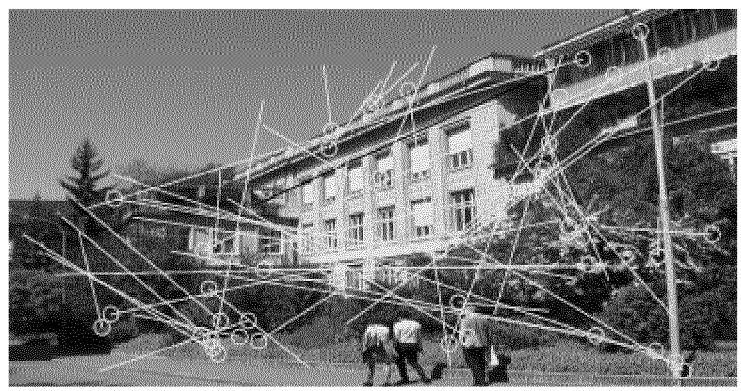
Figure 3E:
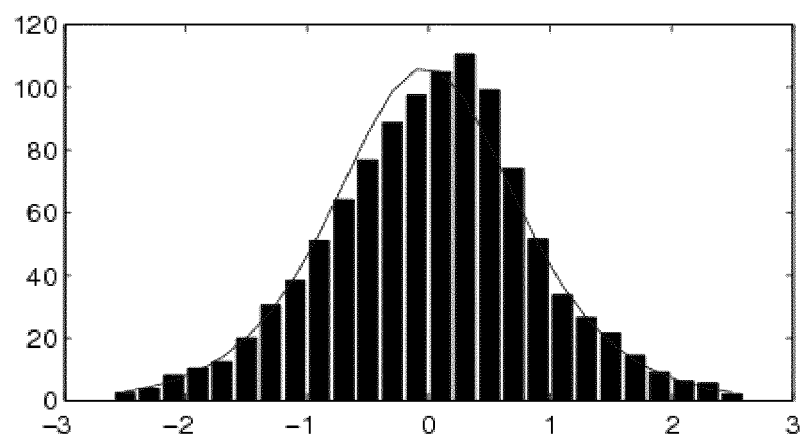
Figure 3F:
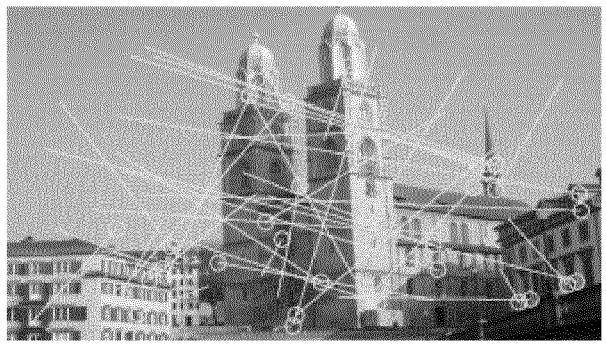
Figure 3F:
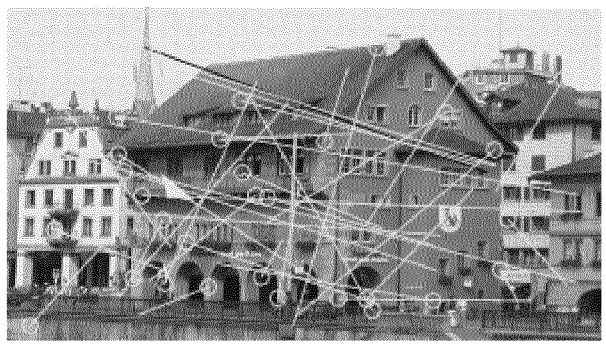
Figure 3F:
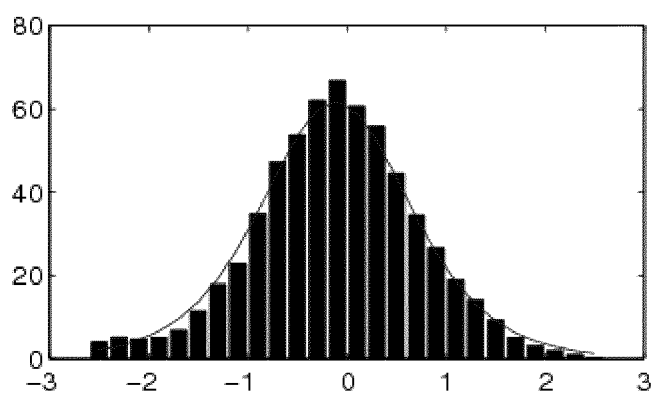

The shape of the outliers outlier density function for the case a=2 is illustrated in FIG. 2. It has to be noted that this outlier density function does not account for the aspect ratio of rectangular images, since the horizontal and vertical variances are supposed to be the same.

FIGS. 3A-3F illustrate several examples, each showing a respective pair of images (query image-reference image) taken from the Zurich Building Image Database (consisting of 1005 images, in 5 views each of 201 buildings). The keypoints are indicated by circles, while the lines point to the positions of the matched keypoints in the other image. For each image pair, there is illustrated the LDR histogram and the corresponding outliers density function, in the formulation of Equation 15. It should be noted that all of the keypoint matches must be considered as outliers, since the images show different buildings. From these examples, it can be viewed that the outlier density function approximates well the LDR histogram whenever all matches are outliers.

The concept of "discretized outlier density function" is also introduced.

Let the bins, i.e. the intervals for LDR values used to compose the LDR histogram, be denoted by $T_k$, $k=1, \ldots, K$. The discretized outlier density function assigns probability values to each of the K bins, $$p: \{1, \ldots, K\} \to [0,1]$$

such that in each k-th bin the value is equal to the integral of the outlier density function over that bin, $$f(k) = \int_{z \in T_k} f_Z(z) dz \tag{15a}$$

and wherein each value f(k) is called "outlier probability".

1.2.2—The LDR when Both Pairs are Inliers

Generally, the LDR histogram for the case in which all the keypoint matches are inliers is often very different from the LDR histogram for outliers. In a large number of practical cases, the LDR histogram for only inliers is narrower than the LDR histogram for only outliers, i.e., it is equal to zero over a number of bins (specifically, the lateral ones) where the LDR outlier histogram is nonzero.

Since associated keypoints $x_i$ and $y_i$ in the two images are related through a mapping of the same point on the viewed object, it is advantageous to consider the upper and lower bounds of the LDR histograms instead of using probabilistic modeling. It is supposed that two distinct keypoints in one image are never extremely close to each other, at least not in only one of the images. Then there exist numbers a and b, neither very large nor very small (depending on how much lengths may be squeezed and expanded between the two images), such that $$a\|x_i - x_j\| \leq \|y_i - y_j\| \leq b\|x_i - x_j\|. \tag{16}$$

In this case the LDR is restricted to an interval $$ldr(x_i, x_j, y_i, y_j) \in [-\ln b, -\ln a], \tag{17}$$

Also in most couples of images of planar surfaces, the distances between keypoints are neither squeezed nor expanded very much. Features like SIFT (Scale-Invariant Feature Transform) and SURF (Speeded Up Robust Features) are invariant to similarity transformations but not to affine transformations, let alone homographies. This means that if the perspective distortion is severe such that [−ln b, −ln a] could theoretically be wide, the keypoints that might produce extreme LDR values will not be associated as their features will have different descriptors. Consequently, the inlier histograms for correctly associated keypoints are likely to remain in a relatively narrow interval.

Figure 4:
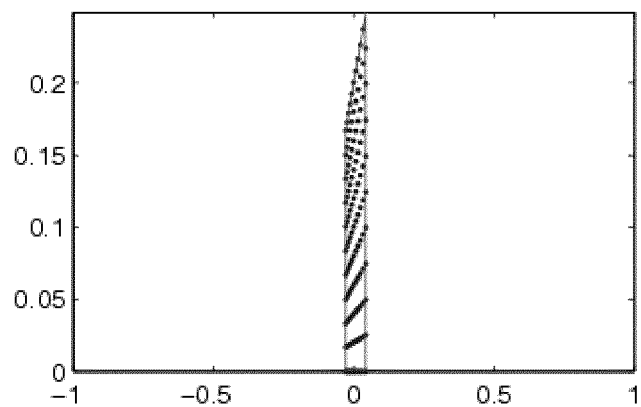
FIG. 4 illustrates an exemplary case in which a query image and a reference image depict a same planar object viewed from very different angles.
Figure 4:
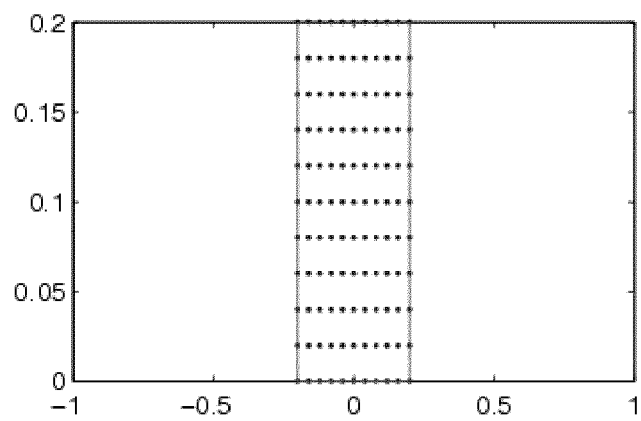
Figure 4:
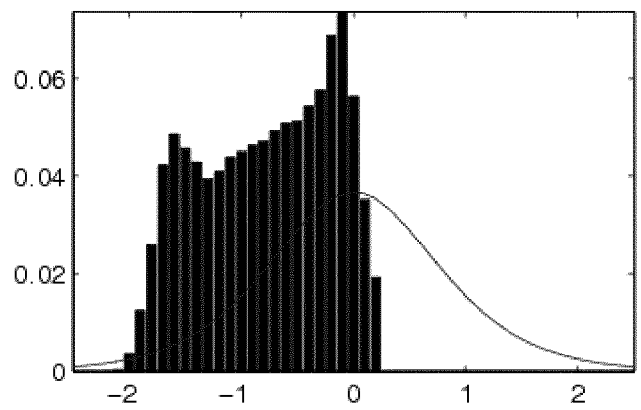

FIG. 4 illustrates an exemplary case in which the query image and the reference image depict a same planar object (a rectangle) viewed from very different angles (in the example at issue, −75 and 0 degrees). The bottom diagram of FIG. 4 depicts an LDR histogram and an outlier density function calculated from said image pair.

Figure 5A:
FIGS. 5A and 5B illustrate two exemplary cases in which nearly planar objects are shown with moderate differences in the viewing angles.
Figure 5A:
Figure 5A:
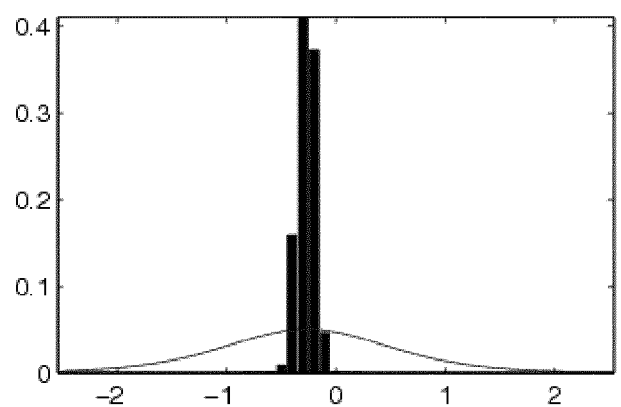
Figure 5B:
Figure 5B:
Figure 5B:
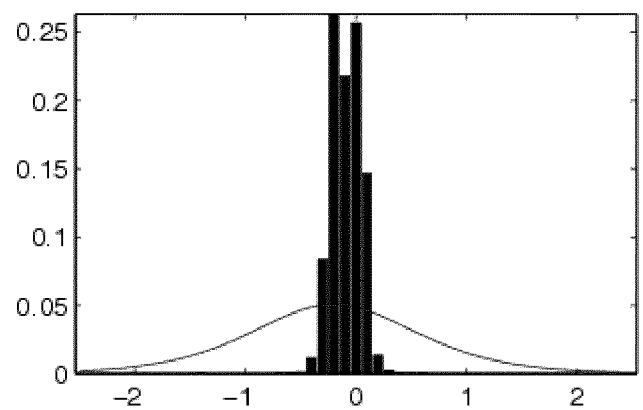

FIGS. 5A and 5B illustrates two exemplary cases in which nearly planar objects (building faces) are shown with moderate differences in the viewing angles. The bottom diagrams of FIGS. 5A and 5B depict the corresponding LDR histograms and the outlier density functions.

1.2.3—The LDR with Pairs of Both Types

The third alternative provides that the pair $x_i$, $y_i$ is an inlier and $x_j$, $y_j$ is an outlier (or vice versa). In this case as well, it is assumed that the keypoints in one image are randomly distributed, as one cannot know beforehand any geometric pattern or rule that constrains the location of keypoints contained in an unknown image.

Each keypoint can therefore be represented by a random variable, for example with a normal distribution, like in Equation 10. The difference vector between two keypoints is modeled as in Equation 11, since one is taken to be an inlier and the other to be an outlier, and there can be no correlation between them.

However, the F-distribution of Equation 12 does not hold exactly, since the numerator and denominator are not independent, contrarily to the hypothesis for the F-distribution. The keypoints in the case of an inlier/outlier pair are $$(x_i, y_i), (x_j, \pi(x_j))$$

where $\pi$ is the mapping (albeit unknown) of the inlier keypoint in one image onto the other image. The random variable representing the squared distance ratio would in this case be $$S_{ij}^2 = \frac{\|X_i - X_j\|^2}{\|Y_i - \pi(X_j)\|^2} \tag{18}$$

where numerator and denominator clearly are not independent, since both are functions of Xj. Finding the probability density function for the variable in Equation 12 is quite difficult, but as far as the proposed method is concerned, it might not be necessary. The experience has brought to assume that, with small error, it is possible to model the histogram of the LDR for these two cases (both inlier pairs as opposed to an inlier/outlier pair) with the same model probabilities: the outlier model function of Equation 15.

1.3 A Non-Parametric Probability Density Function for Outliers

The logarithmic distance ratio for outliers can be seen as the (logarithm of the) ratio of lengths of two random line segments. Since the outliers are formed by unpredictable matching errors, the endpoints of the line segments are modeled as independent random variables. Moreover, the endpoints within one image are identically distributed. Previously, it was considered the endpoints as having a normal distribution in the plane; here it is introduced an alternative outlier probability density function based on the assumption that the endpoints be restricted to the set of keypoints (those that remain after matching, regardless of the correctness). The goal of this alternative procedure is to identify better the peak of the LDR histogram for outliers. In many cases this can improve the performance for comparing images and finding inliers.

It is assumes that all line segments are equally probable, $$p(A = x_i, b = x_j) = p(C = y_k, D = y_l) = \frac{1}{N(n-1)} i \neq j, k \neq l$$

where A, B denote the random variables for endpoints in one image and C, D denote the random variables for endpoints in the other image. The random LDR can be express as a difference $$\ln\frac{\|A - B\|}{\|C - D\|} = \ln\|A - B\| - \ln\|C - D\| \tag{19}$$

such that probabilities separately for each of the two terms can be estimated. To this end, it is introduced an extension to the histogram bins such that the bins form a subset of the extended set, $$\{T_1, \ldots, T_K\} \subseteq \{\ldots, \eta_{-1}, \eta_0, \eta_1, \ldots\}$$

with aligned indices such that $T_k = \eta_k$ for $k=1, \ldots, K$.

By considering all possible endpoints for the line segments, the probabilities that the terms fall within given bins can be estimated, $$\hat{P}(\ln\|A - B\| \in \eta_m) = \frac{1}{N(N-1)} \sum_{i,j;i \neq j} v(\ln\|x_i - x_j\| \in \eta_m)$$

and $$\hat{P}(\ln\|C - D\| \in \eta_n) = \frac{1}{N(N-1)} \sum_{i,j;i \neq j} v(\ln\|x_i - x_j\| \in \eta_n)$$

The function v is 1 when the argument (e.g. $\ln\|x_i - x_j\| \in \eta_n$) is true and 0 when it is false. The bins imply a scalar quantizer q, $$q: R \rightarrow \{\ldots, 1, 0, 1, \ldots\}$$

such that $$w \in \eta_k \Leftrightarrow q(w) = k$$

The quantizer transforms the terms in Equation 19 into integer-valued random variables. The first term becomes $$U = q(\ln\|A - B\|)$$

with discrete probability function $$p_U(m) = P(U = m) = \hat{P}(q(\ln\|A - B\|) = m),$$

and the second term becomes $$V = q(\ln\|C - D\|)$$

with discrete probability function $$p_V(n) = P(V = n) = \hat{P}(q(\ln\|C - D\|) = n),$$

The discrete probability function for the difference is obtained by the convolution formula for differences $$f(k) = P(U - V = k) \sum_{m=\infty}^{\infty} p_U(k + m) p_V(m) \tag{20}$$

The function in Equation 20 can be used as an alternative formulation of the discrete outlier probability density function.

Section 2—Count and Identification of Inliners 2.1 The Outlier Normal

According to the proposed method, it is now described a way to identify the inlier matches by analysing the LDR values. A spectral clustering algorithm has been developed that yields the correct inlier set as an expected value.
The LDR of Equation 2 is known for each couple of keypoint matches, $$z_{ij} = \mathrm{ldr}(x_i, x_j, y_i, y_j), i \neq j \tag{21}$$

A function that conveys information of whether a given LDR value represents a pair of inlier matches has been sought by the Applicant. The Applicant has found that a function that permits identification of the inlier matches through a computationally cheap algorithm should have the form:

$$g(z) = p_z(z) - \alpha \cdot f_z(z), \tag{22}$$

where $p_z(z)$ is the overall probability density function representative of the LDR of the various pairs of keypoint matches, $f_z(z)$ is the outlier probability density function and $\alpha$ is a parameter. By integration over the bins of the LDR histogram, a function of k (the bin index) is obtained:

$$g(k) = \int_{z \in T_k} p_z(z) dz - \alpha \int_{z \in T_k} f(z) dz \tag{23}$$

The first term is proportional to the expected value of the overall LDR histogram in the bin $T_k$. The integral of the outlier probability density function in the second term may be written as f(k).
Equation 23 may now be written as $$g(k) = n^{-1} E(h(k)) - \alpha f(k) \tag{24}$$

$$ng(k) = h(k) - \alpha n f(k) \tag{25}$$

since it is assumed that the overall probability density function is such that the histogram is equal to its expected value. By substituting d(k)=ng(k) and β=nα, the function $$d(k) = h(k) - \beta f(k) \tag{26}$$

is finally obtained that will be used for identifying inliers.

2.2 The Inlier Evidence Matrix

The Equations 21 and 26 give rise to a very useful matrix called inlier evidence matrix. The link is given by the quantization q, implied by the histogram bins, that maps an LDR value to an index, $$z \in T_k \Rightarrow z \xrightarrow{q} k$$

The LDR values of Equations 21 are then ordered in a matrix, $Z \in R^{N \times N}$ with value $z_{ij}$ in element (i, j). The diagonal is arbitrarily fixed to zero. Z is then mapped to a matrix D of the same size, such that $$D_{ij} = \begin{cases} d(q(z_{ij})) = d_q(z_{ij}) & i \neq j \\ 0 & i = j \end{cases} \tag{27}$$

where the diagonal values are again set to zero. This is the matrix that will be analysed to reveal the inliers. In the following, $d_q$ will be written in place of the composition $d \circ q$.

In order to develop the algorithm, the quantized LDR values in the off-diagonal elements in D are considered as if they were values of independent random variables. Any of these variables is characterized by one out of two density functions: one for inlier pairs of matches and one for mixed/outlier pairs of matches. To model pairs of inlier matches, random variables $V_{ij}$, i, j∈1, . . . , N that are independent and identically distributed with the conditional density function p(v|in) (see Equation 15) are defined.

$$V \approx p(v \mid \mathrm{in}) \tag{28}$$

$$\Downarrow$$

$$P(q(V) = k) = \int_{v \in T_k} p(v \mid \mathrm{in}) dv \tag{29}$$

where $k = q(V_{ij})$. The probability density function p(v|in) is left undefined.

Likewise, for outlier or mixed pairs the independent and identically distributed (i.i.d.) variables $Z_{ij}$, i, j∈1, . . . , N, with density function given by the outlier density function $p(z|\mathrm{out}) = f_Z(z)$ are defined as $$Z \approx p(z \mid \mathrm{out}) = f_Z(z) \tag{30}$$

$$\Downarrow$$

$$P(q(Z) = k) = f(q(Z)) \tag{31}$$

where f is the discrete probability density function of Equation 25. If it is possible to establish which pairs are inliers and which are mixed or outliers pairs, then the above definitions yield a random matrix F with elements (its diagonal elements are 0), $$F_{ij} = \begin{cases} d_q(V_{ij}) & (i, j) \quad \text{inlier pair} \\ d_q(Z_{ij}) & (i, j) \quad \text{mixed/outlier pair} \\ 0 & i = j \end{cases} \tag{32}$$

2.3 Inliers Revealed by an Eigenvalue and an Eigenvector

The goal is to determine the true inlier indicator vector which is defined as a vector $r \in R^N$ such that $$r_n \begin{cases} 1 & (x_n, y_n) \quad \text{inlier} \\ 0 & (x_n, y_n) \quad \text{outlier} \end{cases} \tag{33}$$

The Applicant has noted that for a particular choice of β, the dominant eigenvector of the expected value for F is identical to the true inlier indicator vector. Furthermore, the Applicant has noted that the observed matrix D has a dominant eigenvector that is very similar to the inlier indicator vector such that it may be used to identify the inliers.

In particular, β (of Equation 26) is determined in such a way that the expected product Fr is proportional to the inlier vector r itself, $$E(Fr) = \mu r. \tag{34}$$

First a special case of a product Fr is examined.
It is supposed that there are 5 keypoint pairs and that the inlier indicator vector is $$r = [1\ 1\ 0\ 1\ 0]^T$$

The first, second, and fourth elements indicate inliers matches. The matrix F is as follows, $$F = \begin{bmatrix} 0 & d_q(V_{12}) & d_q(Z_{13}) & d_q(V_{14}) & d_q(Z_{15}) \\ d_q(V_{21}) & 0 & d_q(Z_{23}) & d_q(V_{24}) & d_q(Z_{25}) \\ d_q(Z_{31}) & d_q(Z_{32}) & 0 & d_q(Z_{34}) & d_q(Z_{35}) \\ d_q(V_{41}) & d_q(V_{42}) & d_q(Z_{43}) & 0 & d_q(Z_{45}) \\ d_q(Z_{51}) & d_q(Z_{52}) & d_q(Z_{53}) & d_q(Z_{54}) & 0 \end{bmatrix}$$

The product is $$Fr = \begin{bmatrix} d_q(V_{12}) + d_q(V_{14}) \\ d_q(V_{21}) + d_q(V_{24}) \\ d_q(Z_{31}) + d_q(Z_{32}) + d_q(Z_{34}) \\ d_q(V_{41}) + d_q(V_{42}) \\ d_q(Z_{51}) + d_q(Z_{52}) + d_q(Z_{54}) \end{bmatrix}$$

It is seen that some elements in the product Fr are sums of two terms: for any row i among 1, 2, and 4, the zero on $F_{ii}$ is multiplied with the element $r_i=1$, thus 'missing' a term in the resulting inner product. For rows i=3 and i=5, the zero on the diagonal in F is multiplied with $r_i=0$, and the nonzero elements in the row of F are all multiplied by nonzero elements in the indicator r; thus no term is missed.

In the general case, it is assumed that there are m inliers. The i'th element in the vector E (Fr) is the expected value of the inner product of the i'th row of F and the vector r. If the i'th match is an inlier pair, then the row in F contains $d_q(V_{ij})$ in the nonzero positions of r (inlier positions), except at the diagonal, hence it is the sum of m−1 elements. If the i'th match is an outlier, this inner product is the sum of m elements $d_q(Z_{ij})$. Since the $V_{ij}$ are identically distributed, the expected value does not depend on (i, j); $E(d_q(V_{ij}))=E(d_q(V))$. For the same reason, $E(d_q(Z_{ij}))=E(d_q(Z))$.

$$E\left(\sum_j F_{ij} r_j\right) = \sum_{j: a_j=1} E(F_{ij}) = \begin{cases} (m-1)\cdot E(d_q(V)) & i \text{ inlier} \\ m\cdot E(d_q(Z)) & i \text{ outlier} \end{cases} \quad (35)$$

The fact that the above expression has only two values is compatible with the fact that the eigenvector r is a true inlier indicator.

The Parameter β

We consider first the expected element in E(Fr) for an outlier row in F. The expected value in this element is proportional to $$E(d_q(Z)) = \int d_q(z) f_z(z) dz \quad (36)$$

$$= \sum_{k=1}^{K} \int_{z: q(z)=k} d(k) f_z(z) dz$$

$$= \sum_{k=1}^{K} d(k) f(k)$$

$$= \sum_{k=1}^{K} (h(k) - \beta f(k)) f(k).$$

Now it is imposed that this element be equal to zero (which is the value of the corresponding element in μr)

$$mE(d_q(Z)) = 0 \quad (37)$$

$$\Updownarrow$$

$$\sum_{k=1}^{K} (h(k) - \beta f(k)) f(k) = 0$$

$$\Updownarrow$$

$$\beta \sum_{k=1}^{K} (f(k))^2 = \sum_{k=1}^{K} h(k) f(k)$$

$$\Updownarrow$$

$$\beta = \frac{\sum_{k=1}^{K} h(k) f(k)}{\sum_{k=1}^{K} (f(k))^2}$$

The Applicant has noted that Equation 38 is an important result: the factor β results from projecting the overall LDR histogram onto the discretized outlier probability density function. Therefore, the term βf(k) of Equation 26 may be called the outlier component of the histogram. The function d(k) is orthogonal to the outlier component, hence the name outlier normal (in the same manner that a 'surface normal' is the vector normal to a surface.)

This confirms that one of the two values of the elements of the eigenvector r is zero. The other value of the elements of the eigenvector r is a constant value, as per Equation 35. Hence, the eigenvector r is a true inlier indicator vector.

The Number of Inliers

It is now considered the expected element in Fr for an inlier row in F. This element must be equal to μ, the value of the corresponding element in μr. It is started by considering the expected value $$E(d_q(V)) = \int d_q(v) p(v \mid \text{in}) dv \quad (39)$$

$$= \sum_{k=1}^{K} \int_{v: q(v)=k} d(k) p(v \mid \text{in}) dz$$

$$= \sum_{k=1}^{K} d(k) \int_{v: q(v)=k} p(v \mid \text{in}) dz$$

$$= \sum_{k=1}^{K} d(k) p(k \mid \text{in})$$

$$= \sum_{k=1}^{K} (h(k) - \beta f(k)) p(k \mid \text{in}).$$

where the integral of the inlier probability density function over the bin $T_k$ is denoted by p(k|in). This leads to an expression of the number of inliers:

$$\mu = (m-1) E(d_q(V)) \quad (40)$$

$$\Updownarrow$$

-continued $$m = 1 + \frac{\mu}{E(d_q(V))} \quad (41)$$

The denominator found in this equation remains unknown, as the integrated probability density function p(k|in) (see Equation 39) is not available. The Applicant proposes to replace the unknown denominator $E(d_q(V))$ with the maximum value of the outlier normal d(k) (Equation 26)

$$E(d_q(V)) = \sum_{k=1}^{K} d(k)p(k \mid \text{in}) \quad (42)$$

$$\Downarrow$$

$$E(d_q(V)) \leq \max_{k=1}^{K} d(k) = \max_{k=1}^{K} (h(k) - \beta f(k)).$$

This value is known, as all the terms are available: the LDR histogram h, the projection coefficient β, and the integrated outlier probability density function f. It is obtained $$\hat{m} = 1 + \frac{\mu}{\max_{k=1}^{K} d(k)} \leq m \quad (43)$$

The Applicant has determined that this number $\hat{m}$ slightly underestimates the number of inliers m. In particular, the Applicant has determined that selecting the inliers as the keypoint matches corresponding to the $\hat{m}$ highest elements of the eigenvector r achieves an improved selection of the inliers with respect to the outliers, even in the presence of noise related to the statistical nature of the matrix D used for the computation and to the limited dimension N of the same matrix D.

The Dominant Eigenvalue

The eigenvalue that was posited in Equation 34 and specified in Equation 40 is indeed dominant.

The expected value of element i, j in the matrix F is, according to Equations 32 and 37, $$E(F_{ij}) = \begin{cases} E(d_q(V)) & (i, j) \text{ inlier pair} \\ E(d_q(Z)) & (i, j) \text{ mixed/outlier pair} \\ 0 & i = j \end{cases} \quad (44)$$

$$= \begin{cases} E(d_q(V)) & (i, j) \text{ inlier pair} \\ 0 & (i, j) \text{ mixed/outlier pair} \\ 0 & i = j \end{cases}$$

Therefore, the matrix may be written as $$E(F) = E(d_q(V)) \cdot (rr^T - \text{diagr}(r)), \quad (45)$$

where r is the inlier indicator vector of Equation 42. The matrix diag(r) has r on the diagonal and all other elements zero. The eigenvalues of E(F) are $$\mu_1 = (m-1)E(d_q(V)) \quad (46)$$

$$\mu_2 = -E(d_q(V))k = 2, \ldots, m \quad (47)$$

$$\mu_n = 0, n \geq 3 \; n > m \quad (48)$$

The eigenvalue $\mu_1$ is equal to μ of Equation 40, and it is dominant if the number of inliers m is greater than or equal to 3.

2.4 Fast Eigenvector Computation

The random matrix F is related to the inlier evidence matrix D. The matrix D can be written as the sum D=E(F)+W of the matrix E(F) and of a term W corresponding to noise.

The Applicant has determined that the presence of the noise component W can be neglected for the purposes of the present invention and that the inlier evidence matrix D can be exploited for the computation. In particular, the Applicant has determined that the inlier evidence matrix D has a dominant eigenvector that is very similar to the inlier indicator vector. The dominant eigenvector of the inlier evidence matrix D can, therefore, be used to identify the inliers.

The estimated inliers correspond to the m largest elements in the dominant eigenvector of D. The goal is to keep the eigenvector computation as fast as possible, also at the expense of some precision. Methods for finding the dominant eigenvector are known in the art (see for example the power iteration and the Rayleigh quotient iteration disclosed in "Numerical Linear Algebra" by L. Tredethen and D. Bau, *The Society for Industrial and Applied Mathematics*, 1997.

Both methods are iterative and rely on an initial guess of the dominant eigenvector, and a rough-and-ready candidate is the mean column, which is a close approximation for the dominant eigenvector of a matrix like D.

Section 3—Main Steps of the Proposed Method

Figure 6:
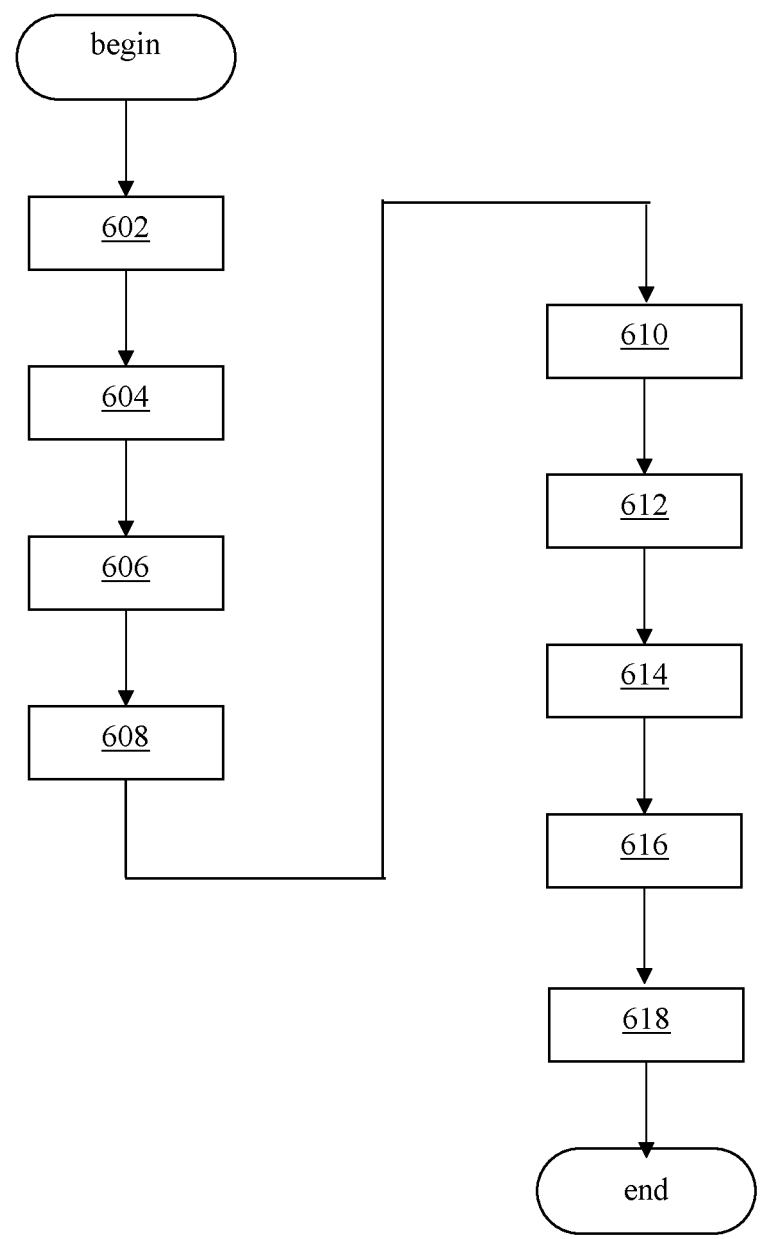
FIG. 6 is a flow chart illustrating the main steps of the method of the present invention.

The main steps of the previously described method will be now illustrated in FIG. 6.

Specifically, FIG. 6 is a flow chart illustrating the main steps of the proposed method.

It is assumed to start with a pair of images to be compared, i.e., a first image (the query image) comprising N keypoints $x_i$ and a second image (the reference image) comprising N keypoints $y_i$. Each keypoint $x_i$ on the query image is associated to a corresponding keypoint $y_i$ on the reference image so as to define a respective keypoint match $(x_i, y_i)$.

Then a distance ratio histogram from the keypoint matches $(x_i, y_i)$ using a function of distance ratio which is invariant for similarities is generated. For example, the Log Distance Ratio (LDR) histogram is generated from the keypoint matches $(x_i, y_i)$ using Equation 2 (block 602).

In a further step, (block 604), an outlier density function is calculated by using distance ratios between first and second keypoints randomly selected in the first and second image, see Equation 15 (block 604);

Another step consists of discretizing the outlier density function previously calculated (block 606), for example by applying Equation 15a to the previously calculated outlier density function in order to obtain a discretized version thereof. The next steps of the proposed method allow to assess how many keypoint matches are inliers among the whole set of keypoint matches and optionally to specifically identify which keypoint matches are inliers, and which keypoint matches are outliers. More specifically, a further step (block 608) of the proposed method provides for determining the number of correct keypoint matches (a correct keypoint match is formed by a first and a second keypoint that correspond to a same point of a same object depicted in the first and second images) by determining a matrix (block 610); each element of the matrix corresponds to a respective pair of keypoint matches and has a value corresponding to the difference between the value of histogram at the bin including the distance ratio of the respective pair of keypoint matches and the value of the discretized outlier density function corresponding to said bin, said value of the discretized outlier density function being weighted by means of the parameter β. The proposed method further comprises the steps of: determining a value of the parameter β such that the dominant eigenvector of the matrix is equal to the vector r having elements of a first value if the pair of keypoint match is a correct keypoint match an of a second value if the pair of keypoint match is an incorrect keypoint match and determining the number of correct keypoint matches as an expression of the dominant eigenvalue associated to said dominant eigenvector. Then the determined number of correct keypoint matches is exploited for comparing said first image with said second image.

In particular, the number of correct keypoint matches, determined by means of the above described method, can be used to establish if the compared images have one or more objects in common. The following identification of the inliers can be used to perform operation based on spatial relationships between the query image and the reference image, such as, for example, the localization of a same object in the two images, the stereo vision, the calculation of the motion of a same objects in the two images.

If used for some applications like the augmented reality, the method can optionally include the further step of:
identifying which keypoint matches are most likely correct keypoint matches by identifying a number, equal to said number of correct keypoint matches, of elements of said dominant eigenvector having the highest absolute values (block 618).

The steps of the method described in this section may be carried out by proper processing units, whose structure and function depends on the specific field of application to which they are destined. For example, each processing unit may be a hardware unit specifically designed to perform one or more steps of the method. Moreover, the steps of the method may be carried out by a programmable machine (e.g., a computer) under the control of a corresponding set of instructions.

Section 4—Experimental Results

Figure 7A:
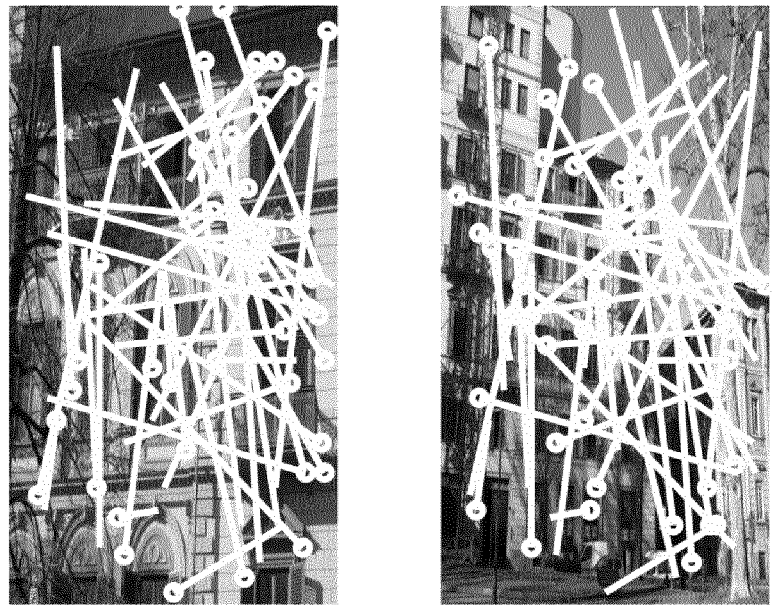
FIG. 7A-7F show results of an experiment carried out by the method of the invention.

FIG. 7A shows an example in which nearly planar objects (building faces) are shown having different zooming and a moderate difference in the viewing angles. The 45 keypoints identified in a keypoint selection stage are indicated by circles, while the lines point to the positions of the matched keypoints in the other image.

Figure 7B:
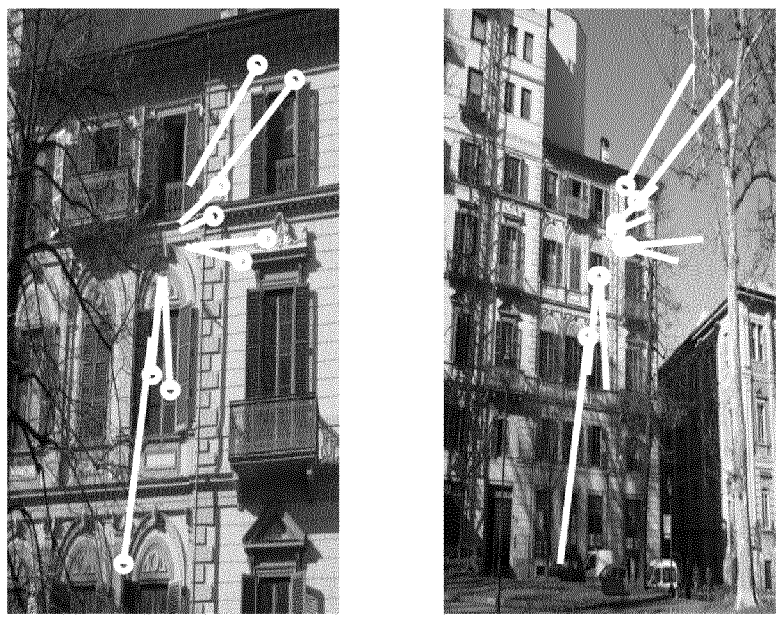
Figure 7C:
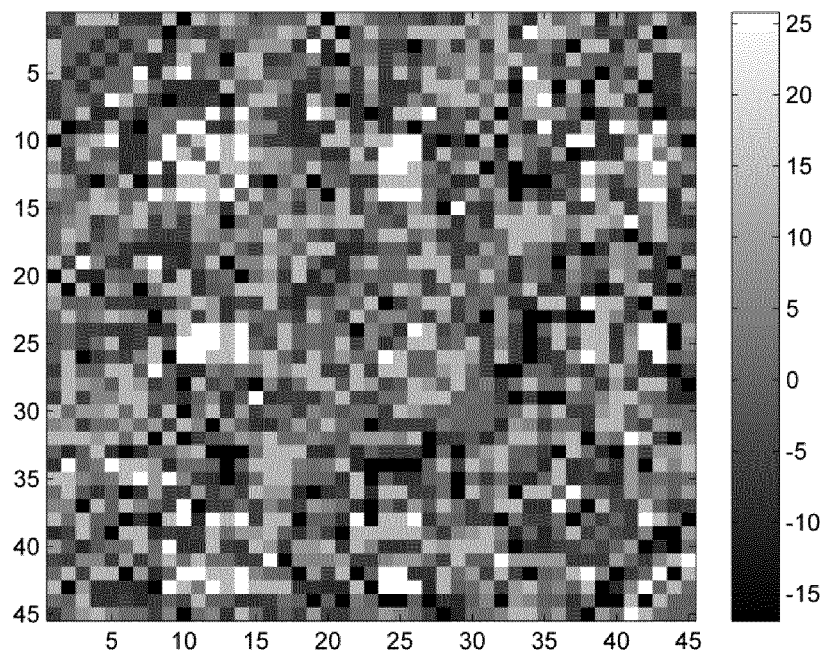

FIG. 7C shows the values, represented in a grey scale, of the (45×45) matrix D as per Equation 27 corresponding to the keypoint matches shown in FIG. 7A. The number of inliers determined on matrix D by the above described method is 9.

Figure 7D:
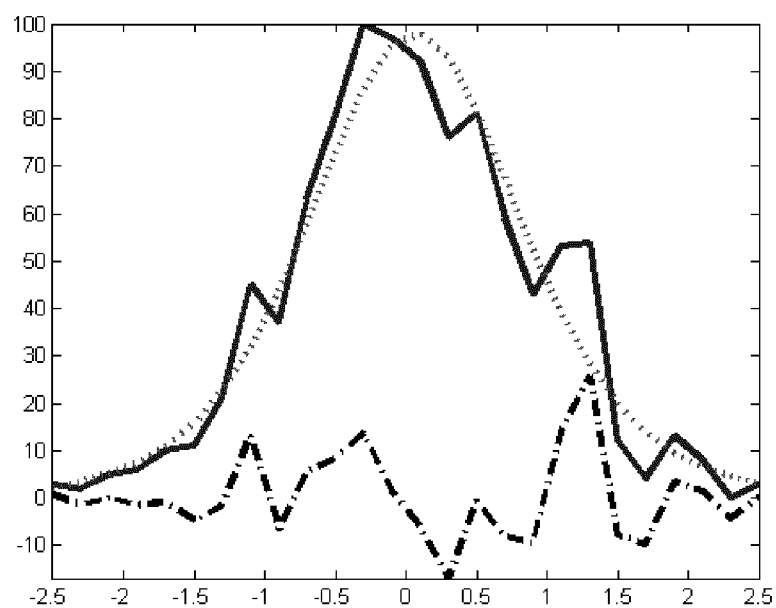

FIG. 7D shows the LDR histogram h(k) as a continuous line, the discretized outlier density function $\tilde{f}(k)$ as a dotted line and the outlier normal function d(k) as a dash-dotted line. The outlier normal function d(k) has a peak corresponding to an LDR value of about 1.4. This peak corresponds to the area in which the correct inliers lie. It is to be remarked that this peak corresponds to a secondary peak, and not to the main peak, of the LDR histogram.

Figure 7E:
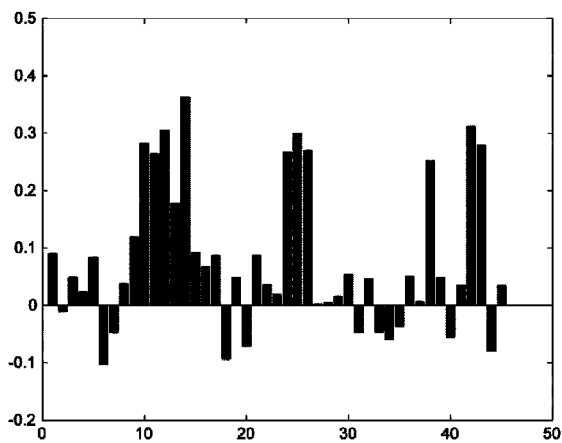

FIG. 7E shows the dominant eigenvector of the matrix D of FIG. 7C, determined according to the above described method.

Figure 7F:
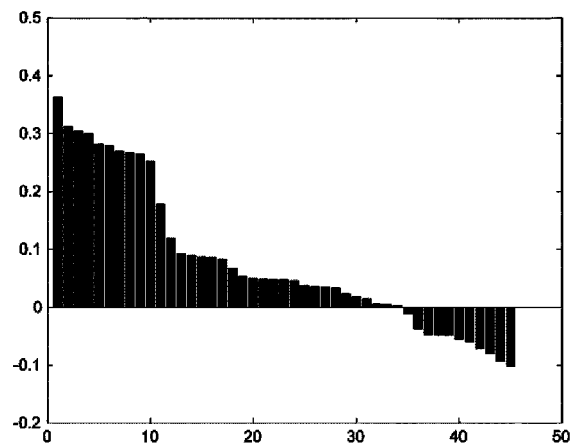

The elements of the same vector arranged in descending order are shown in FIG. 7F. By knowing the number of inliers as determined in the previous stages of the method, i.e., 9, it is possible to identify a same number of elements of the dominant eigenvector that correspond to the inliers, i.e., the 9 largest element (in absolute value) in the dominant eigenvector.

FIG. 7B shows the correct keypoint matches (inliers) between the two image of FIG. 7A identified by means of the above described method.

Section 5—Some Exemplary Applications of the Method

Figure 8:
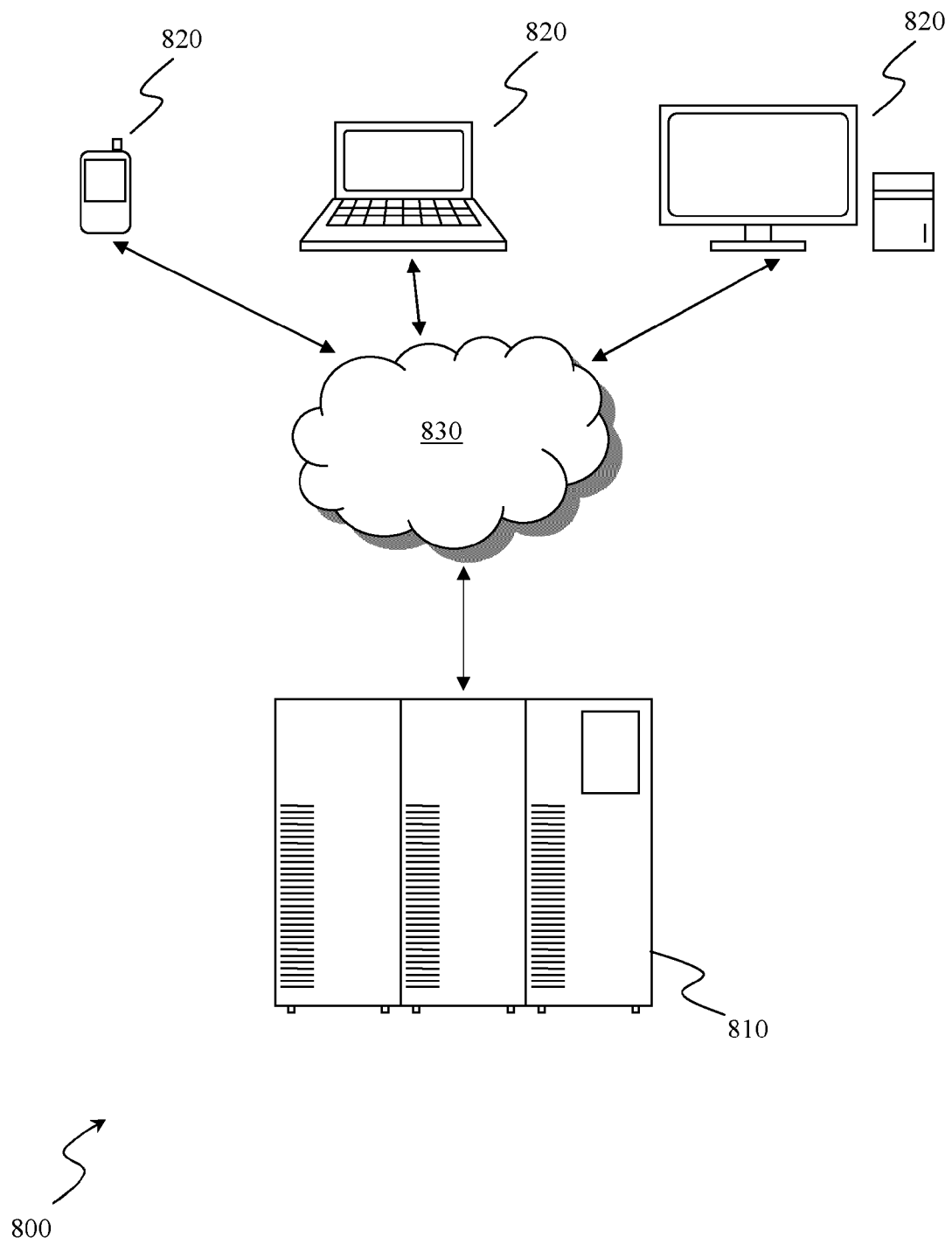
FIG. 8 schematically illustrates a possible scenario wherein the method according to an embodiment of the present invention may be exploited for implementing a visual searching service.

FIG. 8 schematically illustrates a possible scenario wherein the previously described method may be exploited for implementing a visual searching service according to embodiments of the present invention. The scenario of FIG. 8—identified with the reference 800—is structured according to a client-server configuration, wherein a visual search server 810 is configured to interact with a plurality of terminals 820 for exchanging data through an external network 830, such as a MAN, a WAN, a VPN, Internet or a telephone network. Each terminal 820 may be a personal computer, a notebook, a laptop, a personal digital assistant, a smartphone, or whichever electronic device capable of managing a digital image.

Figure 9A:
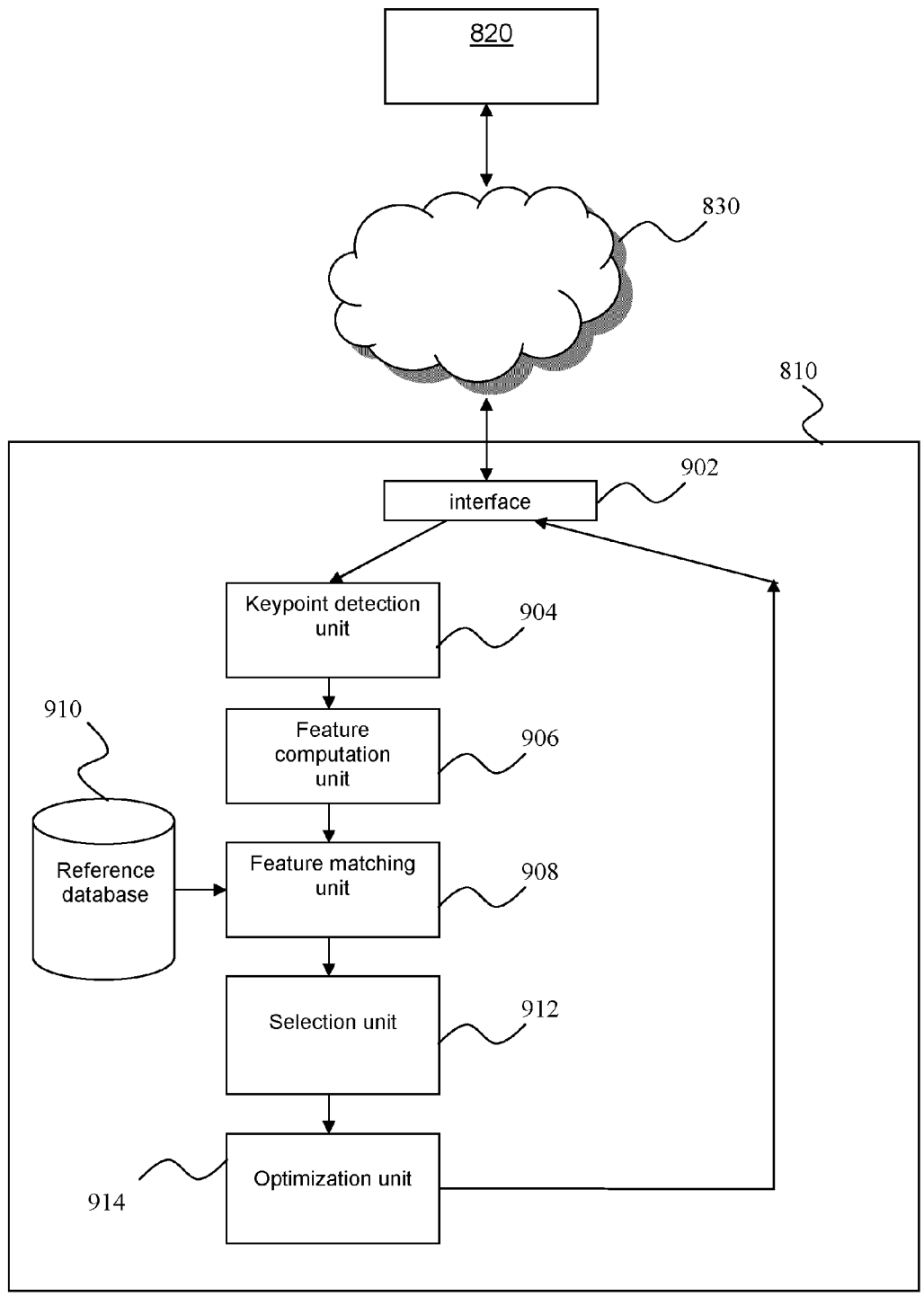
FIG. 9A illustrates a system implementing a visual searching service according to an embodiment of the present invention.

According to an embodiment of the present invention illustrated in FIG. 9A, all the main operations of the visual searching service are carried out by the visual search server 810.

A user of a terminal 820 requesting information related to an object depicted in a picture, sends said picture (which becomes the query image) to the visual search server 810 through the network 830.

The visual search server 810 includes a server interface 902 adapted to interact with the network 830 for receiving/transmitting data from/to the terminals 820. Through the server interface 902, the visual search server 810 receives the query image to be analyzed.

The query image is provided to a keypoint detection unit 904 configured to identify the keypoints included in said image.

Once the keypoints are generated, the local aspect thereof is described by a feature computation unit 906. This operation is carried out by the feature computation unit 906 using known local descriptors, such as the Scale-Invariant Feature Transform (SIFT) and Speeded Up Robust Feature (SURF).

The visual search server 810 further includes a feature matching unit 908 coupled with a reference database 910 storing the reference images to be exploited for the image recognition. A comparison between the local descriptors extracted from the query image and local descriptors of the reference images stored in the reference database is carried out by the feature matching unit 908 using known image feature comparison techniques, for example based on the Euclidean distances among descriptors. The feature matching unit 908 outputs a corresponding list including, for each reference image of the reference database, a corresponding set of keypoint matches. This list may be empty in case the objects depicted in the query images do not correspond to any object depicted in any reference image.

Based on the list generated by the feature matching unit 908, a selection unit 912 selects the first q reference images which share the highest number of keypoint matches with the query image. These reference images are supposed to be the best candidates for including an object depicted in the query image.

According to an embodiment of the present invention, the visual search server 810 further includes an optimization unit 914 configured to implement the method previously described. The optimization unit 914 applies said method to the keypoint matches corresponding to the set of q reference images selected by the selection unit 912: for each pair consisting in the query image and a reference image of the set, the optimization unit 914 calculates the number of correct keypoint matches (inliers). This calculation is carried out according to the method of the present invention. The reference images of the set that results to include a sufficient number of keypoints correctly matched with corresponding keypoints of the query images are considered to include at least (a portion of) a same object depicted in the query image. These latter reference images are then sent back to the terminal 820 through the network 830 as a result of the visual searching request, possibly ordered based on the number of counted inliers.

Figure 9B:
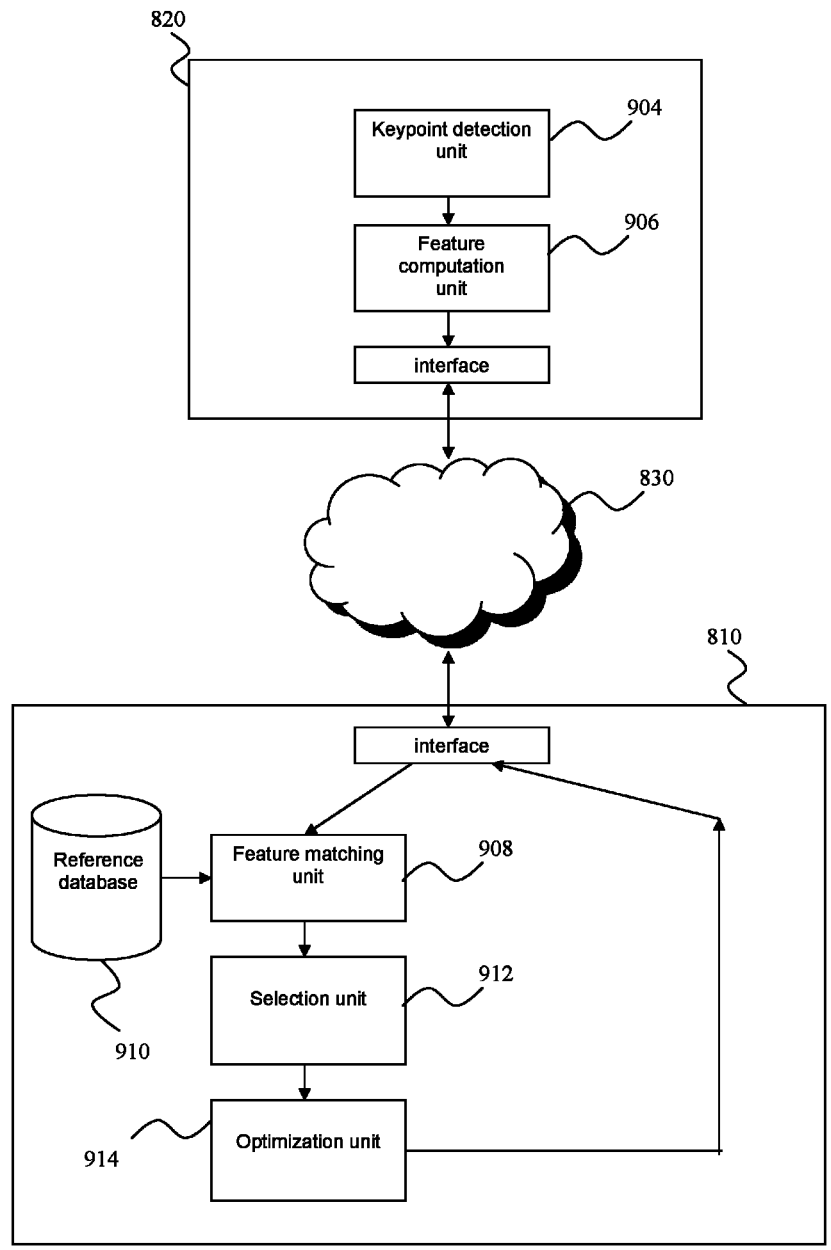
FIG. 9B illustrates a system implementing a visual searching service according to a further embodiment of the present invention.

According to a further embodiment of the present invention illustrated in FIG. 9B, the keypoint detection unit 904 and the feature computation unit 906 are included in the terminals 820 instead of being included in the visual search server 810. In this case, instead of sending the query image to the visual search server 810, each terminal 820 is capable of directly sending the local descriptors locally generated from the query image.

Compared to the previous embodiment, this solution requires the transmission of a lesser amount of data (the local descriptor instead of the entire query image). Moreover, according to this embodiment the computational load to be managed by the visual search server 810 is lowered, allowing the latter to manage more image search requests in the same time.

Figure 9C:
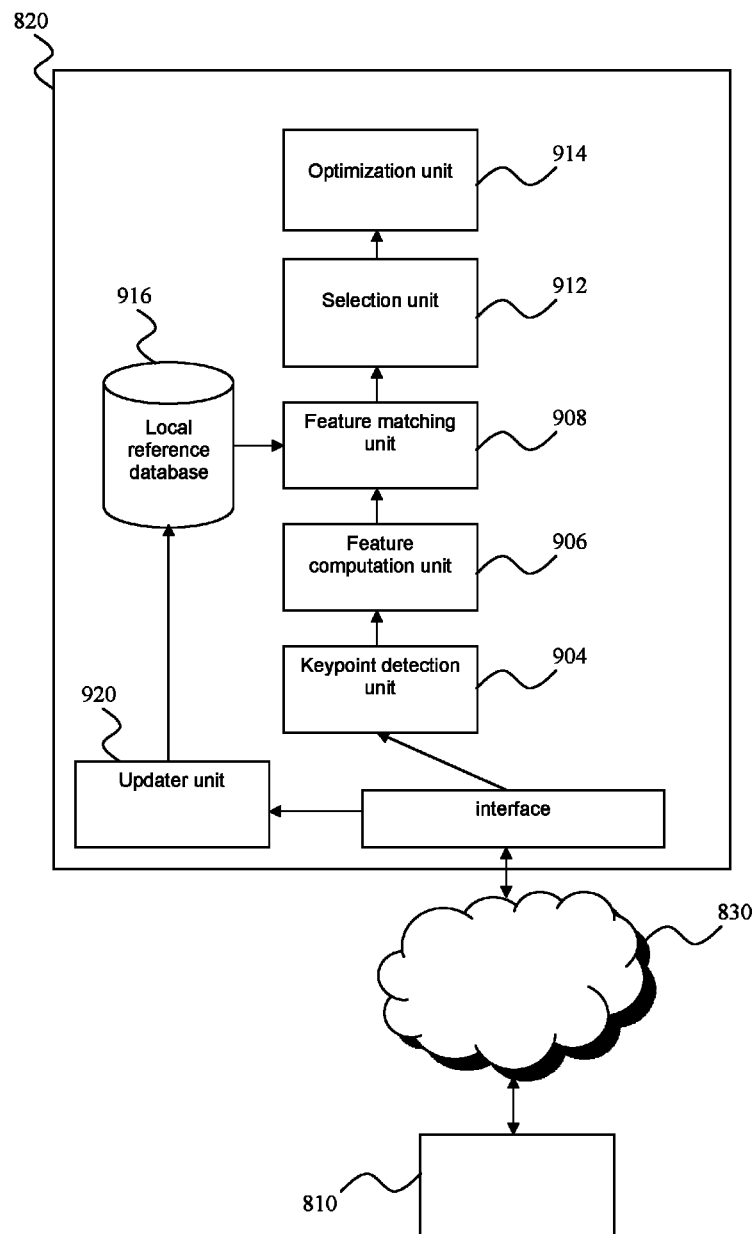
FIG. 9C illustrates a system implementing a visual searching service according to a still further embodiment of the present invention.

According to a still further embodiment of the present invention illustrated in FIG. 9C, almost all the main operations of the visual searching service are carried out by the terminals 820, with the visual search server 810 that just store the keypoints and the local descriptors of the reference images, and sends selected subsets of them to the terminals based on the specific visual search requested by the users of the terminals. For example, in case the terminal 820 is a smartphone equipped with a GPS system and the query image is a picture taken with the camera of the smartphone itself, the selection of which keypoints and local descriptors are to be sent by the visual search server 810 may be based on the actual position of the terminal 820; this solution can be advantageously exploited for some visual search services such as the monument recognition services.

In order to being capable of managing the image comparison operations, the terminal 820 is provided with a local reference database 916 and an updater unit 920, the latter being adapted to receive the keypoints and the local descriptors transmitted by the visual search server 810 and accordingly update the former. It has to be appreciated that it is not strictly necessary to update the local reference database 916 every time an image comparison has to be carried out, being sufficient exploiting the keypoints and the local descriptors already stored therein. For example, the local reference database 916 may be updated by the visual search server 810 only once a day.

Compared with the previous embodiments, this solution is faster, since the amount of data to be transmitted is strongly reduced. Therefore, this solution is particularly suited for the augmented reality applications.

A further possible application of the proposed method is the automatic calibration of video cameras belonging to a stereoscopic camera system. The objective of the calibration is the generation of the so-called fundamental matrix, i.e., a matrix which describes the intrinsic and extrinsic parameters of the acquisition system. The intrinsic parameters describe the camera configurations (e.g., the focal length), while the extrinsic parameters describe the position of the camera within the space.

Figure 10:
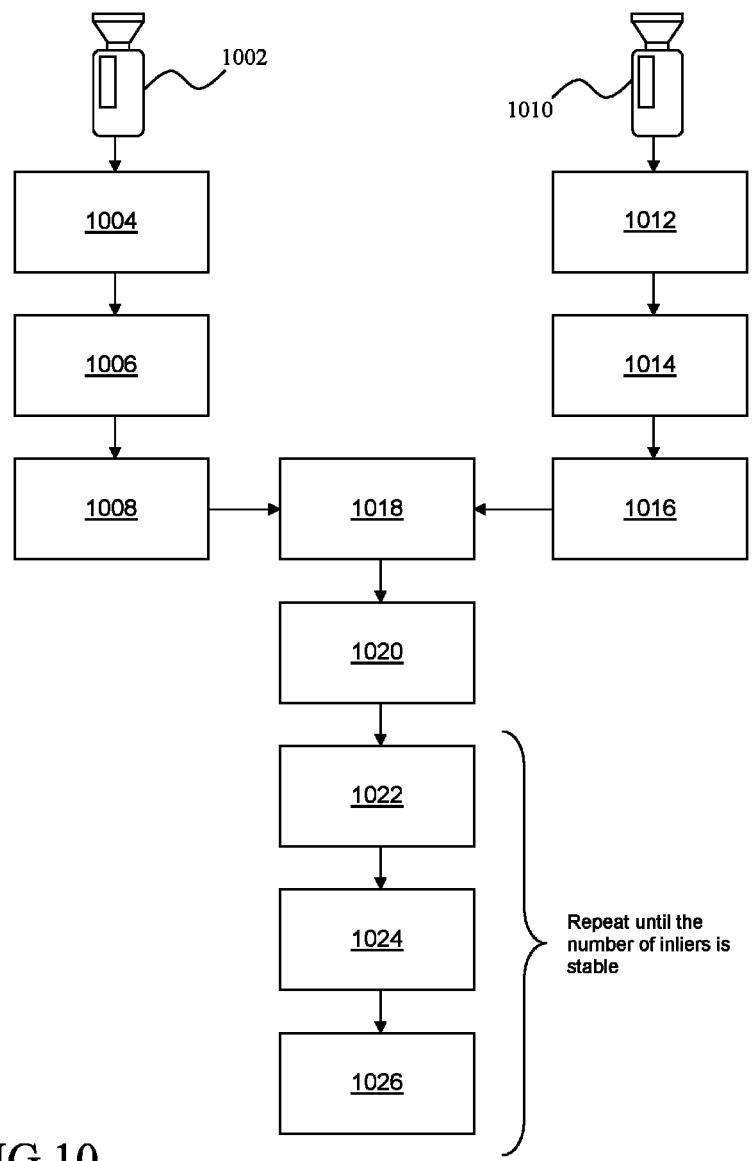
FIG. 10 is a flow chart illustrating main steps of an automatic video camera calibration method according to an embodiment of the present invention.

As illustrated in the schematic flow chart of FIG. 10, a first camera 1002 acquires a first image (block 1004), which is processed in order to identify corresponding first keypoints (block 1006). Once the first keypoints are identified, the local aspect thereof is described through corresponding first local descriptors (block 1008). Similarly, a second camera 1010 acquires a second image (block 1012), which is processed in order to find corresponding second keypoints (block 1014). Then, the local aspect of those keypoints is described through corresponding second local descriptors (block 1016).

By comparing the first local descriptors with the second local descriptors, keypoint matches between the first and second images are generated (block 1018). Then, by applying the method of the present invention, the keypoint matches that are inliers are identified (block 1020).

Once the inliers have been identified, an iterative procedure is carried out for estimating the fundamental matrix (block 1022) in order to find new keypoint matches (block 1024). These operations may be carried out following the procedure described in "In defense of the Eight-Point Algorithm" by R. Hartley, *IEEE Transactions on pattern analysis and machine intelligence*, Vol 19, No. 6, June 1997. The new keypoint matches are then processed again with the method of the present invention in order to identify the inliers (block 1026). This procedure (i.e., the one corresponding to blocks 1022, 1024 and 1026) is reiterated until the number of inliers is stable.

The previous description presents and discusses in detail several embodiments of the present invention; nevertheless, several changes to the described embodiments, as well as different invention embodiments are possible, without departing from the scope defined by the appended claims.

For example, although in the present description reference has been made to the log distance ratio (LDR), similar considerations apply if the histograms are construed with a difference distance ratio, such as a plain distance ratio, without the logarithm; moreover, similar considerations apply if the histograms are construed with multiples and/or powers of the log distance ratio.

Moreover, the concepts of the present inventions can be applied even if the widths of bins of the histograms are different to each other.

The invention claimed is:

1. A method for comparing a first image with a second image, comprising:
    identifying first keypoints in the first image and second keypoints in the second image;
    forming matches between the first and second keypoints by associating each first keypoint with a corresponding second keypoint;
    calculating a plurality of first distance ratios, each first distance ratio being based on the ratio of the distance between a pair of said first keypoints and the distance between a corresponding pair of said second keypoints matching the pair of first keypoints;
    arranging a distribution of values of said calculated plurality of first distance ratios in a histogram having a plurality of ordered bins each corresponding to a respective interval of values of the first distance ratios, the histogram enumerating for each bin a corresponding number of first distance ratios of the distribution having values comprised within the respective interval;
    generating an outlier density function expressing a statistical distribution of a plurality of second distance ratios corresponding to a random selection of keypoints pairs in the first and second images, said plurality of second distance ratios being based on the ratio of the distance between pairs of first keypoints in the first image and the distance between corresponding pairs of randomly selected second keypoints in the second image;
    discretizing said outlier density function by generating for each of said bin a corresponding outlier probability density value;

determining a number of correct keypoint matches, each formed by a first and a second keypoint corresponding to a same point of a same object depicted in the first and second images, said determining a number of correct keypoint matches including:

determining a matrix, each element of said matrix corresponding to a respective pair of keypoint matches and having a value corresponding to the difference between the value of said histogram at the bin including the distance ratio of the respective pair of keypoint matches and the outlier probability density value corresponding to said bin, said outlier probability density value being weighted by a parameter;

determining a value of the parameter such that the dominant eigenvector of the matrix is equal to a vector having elements of a first value if the matched pair of keypoints is estimated to be a correct keypoint match and of a second value if the matched pair of keypoints is estimated to be an incorrect keypoint match; and determining the number of correct keypoint matches as an expression of the dominant eigenvalue associated to said dominant eigenvector, wherein for comparing said first image with said second image the determined number of correct keypoint matches is exploited.

2. The method of claim 1, wherein said determining the number of correct keypoint matches as an expression of the dominant eigenvalue includes:

determining the number of correct keypoint matches as an expression of the ratio between the dominant eigenvalue and the maximum value of the difference between the value of the histogram at the bin including the distance ratio of the respective pair of keypoint matches and the outlier probability density value corresponding to said bin, said outlier probability density value being weighted by said determined parameter.

3. The method of claim 2, wherein said determining the number of correct keypoint matches as an expression of the dominant eigenvalue includes determining said number as one plus said ratio between the dominant eigenvalue and said maximum value.

4. The method of claim 1, further including identifying which keypoint matches are most likely correct keypoint matches by identifying a number, equal to said number of correct keypoint matches, of elements of said dominant eigenvector having the highest absolute values.

5. The method of claim 1, wherein said plurality of first distance ratios correspond to the logarithm of the ratio of the distance between a pair of said first keypoints and the distance between a corresponding pair of said second keypoints matching the pair of first keypoints.

6. The method of claim 1, wherein said parameter is the result of the projection of said histogram onto said discretized outlier density function.

7. A method for retrieving images comprising:

receiving a query image and identifying corresponding first keypoints in said image;

comparing said query image with a plurality of reference images, second keypoints being associated with each reference image, and accordingly associating the first keypoints with the second keypoints of said reference image to generate a corresponding set of keypoint matches;

determining a number of correct keypoint matches between said query image and each of said plurality of reference images based on the method of claim 1;

selecting a subset of reference images as the reference images for which the number of correct keypoint matches exceeds a predetermined threshold.

8. An apparatus for comparing a first image with a second image, said apparatus comprising:

circuitry configured to:

identify first keypoints in the first image and second keypoints in the second image;

form matches between the first and second keypoints by associating each first keypoint with a corresponding second keypoint;

calculate a plurality of first distance ratios, each first distance ratio being based on the ratio of the distance between a pair of said first keypoints and the distance between a corresponding pair of said second keypoints matching the pair of first keypoints;

arrange a distribution of values of said calculated plurality of first distance ratios in a histogram having a plurality of ordered bins each corresponding to a respective interval of values of the first distance ratios, the histogram enumerating for each bin a corresponding number of first distance ratios of the distribution having values comprised within the respective interval;

generate an outlier density function expressing a statistical distribution of a plurality of second distance ratios corresponding to a random selection of keypoints pairs in the first and second images, said plurality of second distance ratios being based on the ratio of the distance between the pair of first keypoints in the first image and the distance between the corresponding pairs of randomly selected second keypoints in the second image;

discretize said outlier density function by generating for each bin a corresponding outlier probability density value;

determine a number of correct keypoint matches, each formed by a first and a second keypoint corresponding to a same point of a same object depicted in the first and second images by:

determining a matrix, each element of said matrix corresponding to a respective pair of keypoint matches and having a value corresponding to the difference between the value of the histogram at the bin including the distance ratio of the respective pair of keypoint matches and the outlier probability density value corresponding to said bin, said outlier probability density value being weighted by a parameter, determining a value of the parameter such that the dominant eigenvector of the matrix is equal to a vector having elements of a first value if the matched pair of keypoints is estimated to be a correct keypoint match and of a second value if the matched pair of keypoints is estimated to be an incorrect keypoint match, and determining the number of correct keypoint matches as an expression of the dominant eigenvalue associated to said dominant eigenvector; and compare said first image with said second image exploiting the determined number of correct keypoint matches is exploited.

9. The apparatus of claim 8, the circuitry being configured to identify which keypoint matches are most likely correct keypoint matches by identifying a number, equal to said number of correct keypoint matches, of elements of said dominant eigenvector having the highest absolute values.

10. A system comprising:

circuitry configured to
- receive a query image and identify corresponding first keypoints in said image, and
- describe the local aspect of said first keypoints through corresponding first local descriptors; and a reference database storing a plurality of reference images, for each reference image, the reference database further storing corresponding second keypoints and corresponding second local descriptors of the second keypoints, the circuitry being further configured to
- compare, for each reference image of at least one group of reference images, the first local descriptors with the second local descriptors of said reference image, and accordingly associate the first keypoints with the second keypoints of said reference image to generate a corresponding set of keypoint matches, and
- select a subset of reference figures based on the comparisons carried out by the circuitry of the system, and the system further including the apparatus according to claim 8 which is further configured to calculate, for each pair comprising the query image and a reference image of the subset, the number of correct keypoint matches.

11. The system of claim 10, further comprising a visual search server and a plurality of terminals configured to provide query images to the visual search server through a network, wherein:

the visual search server includes the circuitry of the system of claim 10 and the apparatus.

12. The system of claim 10, further comprising a visual search server and a plurality of terminals configured to provide query images to the visual search server through a network, wherein:

the visual search server includes the reference database and the circuitry configured to store a plurality of reference images, for each reference image, the reference database further storing corresponding second keypoints and corresponding second local descriptors of the second keypoints; compare, for each reference image of at least one group of reference images, the first local descriptors with the second local descriptors of said reference image, and accordingly associate the first keypoints with the second keypoints of said reference image to generate a corresponding set of keypoint matches; select a subset of reference figures based on the comparisons carried out by the circuitry of the system, and calculate, for each pair comprising the query image and a reference image of the subset, the number of correct keypoint matches, and each terminal includes the circuitry configured to receive a query image and identify corresponding first keypoints in said image; and describe the local aspect of said first keypoints through corresponding first local descriptors.

13. The system of claim 10, further comprising a visual search server and a plurality of terminals configured to exchange data with the visual search server through a network, wherein:

the visual search server includes the reference database, and each terminal includes the circuitry of the system of claim 10, the apparatus, and a respective local database, wherein:

each terminal is configured to receive from the visual search server a respective set of second keypoints and corresponding second local descriptors of the second keypoints stored in the reference database, and the local database of the terminal is configured to store said received set of second keypoints and second local descriptors, said stored set of second keypoints and second local descriptors corresponding to the reference images of the at least one group of reference images.

\* \* \* \* \*